US012707318B2

(12) United States Patent
Ma et al.

(10) Patent No.: US 12,707,318 B2
(45) Date of Patent: Aug. 11, 2026

(54) COMMUNICATION METHOD, APPARATUS, AND SYSTEM

(71) Applicant: HUAWEI TECHNOLOGIES CO., LTD., Shenzhen (CN)

(72) Inventors: Jingwang Ma, Shanghai (CN); Mingyue Yang, Shanghai (CN); Runze Zhou, Shanghai (CN); Qufang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 435 days.

(21) Appl. No.: 17/986,282

(22) Filed: Nov. 14, 2022

(65) Prior Publication Data

US 2023/0070712 A1 Mar. 9, 2023

Related U.S. Application Data

(63) Continuation of application No. PCT/CN2021/073667, filed on Jan. 25, 2021.

(30) Foreign Application Priority Data

May 15, 2020 (CN) ......................... 202010411625.2

(51) Int. Cl.
*H04W 28/02* (2009.01)
*H04W 28/10* (2009.01)

(52) U.S. Cl.
CPC ....... *H04W 28/0268* (2013.01); *H04W 28/10* (2013.01)

(58) Field of Classification Search
None
See application file for complete search history.

(56) References Cited

U.S. PATENT DOCUMENTS

2018/0324633 A1 11/2018 Lee et al.
2019/0191330 A1* 6/2019 Dao .................... H04L 12/4633
(Continued)

FOREIGN PATENT DOCUMENTS

CA 3026841 A1 6/2019
CN 109151913 A 1/2019
(Continued)

OTHER PUBLICATIONS

3GPP TS 23.501 V16.4.0 (Mar. 2020), 3rd Generation Partnership Project; Technical Specification Group Services and System Aspects; System architecture for the 5G System (5GS); Stage 2 (Release 16), 430 pages.

(Continued)

*Primary Examiner* — Srinivasa R Reddivalam
(74) *Attorney, Agent, or Firm* — Rimon PC

(57) ABSTRACT

A communication method is provided. A first network element receives an association identifier of a first application from a session management network element, where the association identifier is for associating different quality of service QoS flows of the first application. The first network element performs joint scheduling on the plurality of QoS flows of the first application that each carry the association identifier. Based on this solution, the first network element can identify, based on the association identifier, QoS flows belonging to a same application, and perform joint scheduling, thereby ensuring that the QoS flows of the same application can arrive at a terminal device simultaneously or a time interval between arrivals at the terminal device is small, so that the service experience of a user can be improved.

20 Claims, 8 Drawing Sheets

(56) References Cited

U.S. PATENT DOCUMENTS

| | | | | |
|---|---|---|---|---|
| 2019/0253917 | A1 | 8/2019 | Dao | |
| 2020/0112907 | A1* | 4/2020 | Dao | H04M 15/8016 |
| 2020/0145876 | A1* | 5/2020 | Dao | H04L 12/1407 |
| 2020/0374948 | A1* | 11/2020 | Pan | H04L 41/5019 |
| 2020/0404538 | A1* | 12/2020 | Zhu | H04L 67/30 |
| 2021/0352521 | A1* | 11/2021 | Pan | H04L 47/805 |

FOREIGN PATENT DOCUMENTS

| | | | |
|---|---|---|---|
| CN | 109565703 | A | 4/2019 |
| CN | 109787799 | A | 5/2019 |
| CN | 110691370 | A | 1/2020 |
| CN | 110830925 | A | 2/2020 |
| CN | 111491313 | A | 8/2020 |
| WO | 2017194768 | A1 | 11/2017 |
| WO | 2019158219 | A1 | 8/2019 |
| WO | 2019228214 | A1 | 12/2019 |
| WO | 2020018012 | A1 | 1/2020 |
| WO | 2020073921 | A1 | 4/2020 |
| WO | 2020077607 | A1 | 4/2020 |
| WO | 2020092173 | A1 | 5/2020 |
| WO | 2020092706 | A1 | 5/2020 |

OTHER PUBLICATIONS

3GPP TSG-SA WG2 Meeting #136, S2-1911437, "LMF selection based on network slicing information," CATT, Nov. 18-22, 2019, Reno, USA; 3 total pages.

3GPP TSG-SA4 Meeting #107, S4-200266, "Addition of MTSI Data Channel Media," Ericsson LM, Wroclaw, Poland, Jan. 20-24, 2020; 18 total pages.

* cited by examiner

COMMUNICATION METHOD, APPARATUS, AND SYSTEM

CROSS-REFERENCE TO RELATED APPLICATIONS

This application is a continuation of International Patent Application No. PCT/CN2021/073667, filed on Jan. 25, 2021, which claims priority to Chinese Patent Application No. 202010411625.2, filed on May 15, 2020. The disclosures of the aforementioned applications are hereby incorporated by reference in their entireties.

TECHNICAL FIELD

This application relates to the field of communication technologies, and in particular, to a communication method, an apparatus, and a system.

BACKGROUND

In an existing quality of service (QoS) model, when a user plane network element receives downlink data packets, the user plane network element encapsulates data packets with a same reliability requirement into a same QoS flow (QoS flow) by using a filter in a packet detection rule (PDR) configured by a session management network element in advance. A plurality of QoS flows may exist in one protocol data unit (PDU) session. However, each QoS flow has an independent and unique QoS flow identifier (QFI), and the QoS flow is associated with one QoS profile. A network side uses, based on a parameter in a QoS profile, a same QoS guarantee for data packets belonging to a same QoS flow. The parameter is, for example, a delay, a forwarding priority, or a packet loss rate.

When an access network device receives a downlink QoS flow from the user plane network element, the access network device encapsulates a plurality of QoS flows into a same radio bearer according to a specific mapping rule, and the same radio bearer enjoys a same air interface side reliability guarantee.

However, in some application scenarios such as a tactile network, augmented reality (AR), and virtual reality (VR), a same application may include a plurality of types of data flows, and each type of data flow has a different requirement on reliability and a rate. Therefore, a core network maps different data flows to different QoS flows. However, because the access network device and the user plane network element use different scheduling policies for the different QoS flows, an excessively large difference between time points at which the different QoS flows of the same application arrive at a terminal device may be caused. Consequently, user experience is extremely poor.

SUMMARY

This application provides a communication method, an apparatus, and a system, to resolve a problem that there is an excessively large difference between time points at which different QoS flows of a same application arrive at a terminal device, to improve the user experience.

According to a first aspect, an embodiment of this application provides a communication method, including: A first network element receives an association identifier of a first application from a session management network element, where the association identifier is for associating different quality of service QoS flows of the first application. The first network element performs joint scheduling on the plurality of QoS flows of the first application that each carry the association identifier.

Based on the foregoing solution, the first network element can identify, based on the association identifier, QoS flows belonging to a same application, and perform joint scheduling, and it is ensured that the QoS flows of the same application can arrive at a terminal device simultaneously or a time interval between arrivals at the terminal device is small, so that the service experience of a user can be improved. However, in a conventional technology, the first network element can only identify different QoS flows, but cannot learn whether there is an internal relationship between the different QoS flows, that is, cannot identify whether the different QoS flows belong to a same application. Consequently, joint scheduling cannot be implemented.

In a possible implementation method, the first network element receives indication information from the session management network element.

That the first network element performs joint scheduling on the plurality of QoS flows of the first application that each carry the association identifier includes: The first network element performs joint scheduling on the plurality of QoS flows based on the indication information.

In a possible implementation method, the first network element is a user plane network element. That the first network element performs joint scheduling on the plurality of QoS flows of the first application that each carry the association identifier includes: The user plane network element receives data packets of the first application. The user plane network element classifies the data packets of the first application into the plurality of QoS flows. The user plane network element continuously sends the plurality of QoS flows to an access network device; the user plane network element sends the plurality of QoS flows to an access network device within a time window of preset duration; or the user plane network element sends the plurality of QoS flows to an access network device, where a sending time interval between any two continuously sent QoS flows in the plurality of QoS flows does not exceed a first time threshold.

Based on the foregoing implementation solution, it can be ensured that the different QoS flows of the first application may arrive at the access network device simultaneously or a time difference between arrivals at the access network device is small, so that the service experience of the user can be improved.

In a possible implementation method, the first network element is an access network device. That the first network element performs joint scheduling on the plurality of QoS flows of the first application that each carry the association identifier includes: The access device accepts the plurality of QoS flows from a user plane network element; or the access device rejects the plurality of QoS flows from a user plane network element.

Based on the foregoing implementation solution, it can be ensured that the QoS flows belonging to the same application can arrive at the terminal device simultaneously, so that the service experience of the user can be improved.

In a possible implementation method, the first network element is an access network device. That the first network element performs joint scheduling on the plurality of QoS flows of the first application that each carry the association identifier includes: The access network device receives at least two QoS flows from a user plane network element, where the at least two QoS flows include the plurality of QoS flows of the first application. The access network device maps, to a first radio bearer, a QoS flow that is in the at least two QoS flows and that carries a first QoS flow identifier and the association identifier.

In a possible implementation method, the access network device maps, to a second radio bearer, a QoS flow that is in the at least two QoS flows and that carries a second QoS flow identifier and the association identifier.

In a possible implementation method, the access network device maps, to a third radio bearer, a QoS flow that is in the at least two QoS flows and that does not carry the association identifier.

Based on the foregoing implementation solution, QoS flows of different applications are mapped to different radio bearers. This can avoid a case in which no data of QoS flows of two or more applications can be transferred when one radio bearer is faulty, so that impact of a fault on the different applications can be reduced.

In a possible implementation method, the first network element is an access network device. That the first network element performs joint scheduling on the plurality of QoS flows of the first application that each carry the association identifier includes: The access network device receives the plurality of QoS flows from a user plane network element. The access network device sends the plurality of QoS flows to a terminal device based on sending proportions respectively corresponding to priorities of the different QoS flows in the plurality of QoS flows.

Based on the foregoing implementation solution, concurrent transmission that is of different QoS flows belonging to a same application and that is performed based on a specific proportion is kept. This can avoid a case in which a next-priority QoS flow starts, after transmission of a high-priority QoS flow ends, to be transferred, so that an unpacking success rate of QoS flows of the same application and user experience are improved.

In a possible implementation method, that a first network element receives an association identifier of a first application from a session management network element includes: The first network element receives QoS policies of the plurality of QoS flows from the session management network element, where the QoS policies each carry the association identifier.

According to a second aspect, an embodiment of this application provides a communication method, including: A session management network element obtains an association identifier of a first application, where the association identifier is for associating different quality of service QoS flows of the first application. The session management network element sends the association identifier to a first network element.

Based on the foregoing solution, the first network element can identify, based on the association identifier, QoS flows belonging to a same application, and perform joint scheduling, and it is ensured that the QoS flows of the same application can arrive at a terminal device simultaneously or a time interval between arrivals at the terminal device is small, so that the service experience of a user can be improved. However, in a conventional technology, the first network element can only identify different QoS flows, but cannot learn whether there is an internal relationship between the different QoS flows, that is, cannot identify whether the different QoS flows belong to a same application. Consequently, joint scheduling cannot be implemented.

In a possible implementation method, the session management network element sends first indication information to the first network element, where the first indication information indicates to perform joint scheduling on the plurality of QoS flows of the first application that each carry the association identifier.

In a possible implementation method, the first network element is a user plane network element. That the first indication information indicates to perform joint scheduling on the plurality of QoS flows of the first application that each carry the association identifier includes: The first indication information indicates to continuously send the plurality of QoS flows.

Based on the foregoing implementation solution, it can be ensured that the different QoS flows of the first application may arrive at an access network device simultaneously or a time difference between arrivals at the access network device is small, so that the service experience of the user can be improved.

In a possible implementation method, the first network element is an access network device. That the first indication information indicates to perform joint scheduling on the plurality of QoS flows of the first application that each carry the association identifier includes: The first indication information indicates that objects on which joint scheduling is to be performed are the plurality of QoS flows; and/or the first indication information indicates to send the plurality of QoS flows based on sending proportions respectively corresponding to priorities of the different QoS flows in the plurality of QoS flows.

In a possible implementation method, the first network element is an access network device. That the first indication information indicates to perform joint scheduling on the plurality of QoS flows of the first application that each carry the association identifier includes: The first indication information indicates to map, to at least one radio bearer, QoS flows that are in at least two QoS flows and that each carry a same QoS flow identifier and the association identifier, where the at least two QoS flows include the plurality of QoS flows.

In a possible implementation method, the first indication information further indicates to map, to a radio bearer different from the at least one radio bearer, a QoS flow that is in the at least two QoS flows and that does not carry the association identifier.

Based on the foregoing implementation solution, QoS flows of different applications are mapped to different radio bearers. This can avoid a case in which no data of QoS flows of two or more applications can be transferred when one radio bearer is faulty, so that impact of a fault on the different applications can be reduced.

In a possible implementation method, the association identifier indicates to perform joint scheduling on the plurality of QoS flows of the first application that each carry the association identifier.

In a possible implementation method, the first network element is a user plane network element. That the association identifier indicates to perform joint scheduling on the plurality of QoS flows of the first application that each carry the association identifier includes: The association identifier indicates to continuously send the plurality of QoS flows.

Based on the foregoing implementation solution, it can be ensured that the different QoS flows of the first application may arrive at an access network device simultaneously or a time difference between arrivals at the access network device is small, so that the service experience of the user can be improved.

In a possible implementation method, the first network element is an access network device. That the association identifier indicates to perform joint scheduling on the plurality of QoS flows of the first application that each carry the association identifier includes: The association identifier indicates that objects on which joint scheduling is to be performed are the plurality of QoS flows; and/or the association identifier indicates to send the plurality of QoS flows based on sending proportions respectively corresponding to priorities of the different QoS flows in the plurality of QoS flows.

In a possible implementation method, the first network element is an access network device. That the association identifier indicates to perform joint scheduling on the plurality of QoS flows of the first application that each carry the association identifier includes: The association identifier indicates to map, to at least one radio bearer, QoS flows that are in at least two QoS flows and that each carry a same QoS flow identifier and the association identifier, where the at least two QoS flows include the plurality of QoS flows.

In a possible implementation method, the association identifier further indicates to map, to a radio bearer different from the at least one radio bearer, a QoS flow that is in the at least two QoS flows and that does not carry the association identifier.

Based on the foregoing implementation solution, QoS flows of different applications are mapped to different radio bearers. This can avoid a case in which no data of QoS flows of two or more applications can be transferred when one radio bearer is faulty, so that impact of a fault on the different applications can be reduced.

In a possible implementation method, that a session management network element obtains an association identifier of a first application includes: The session management network element obtains subscription data of a terminal device from a policy control network element, where the subscription data includes information about the first application, and the information about the first application includes an identifier of the first application and the association identifier; or the session management network element obtains subscription data of a terminal device from a policy control network element, where the subscription data includes information about the first application, and the information about the first application includes an identifier of the first application and second indication information; and the session management network element generates the association identifier based on the second indication information.

In a possible implementation method, that the session management network element sends the association identifier to a first network element includes: The session management network element sends QoS policies of the plurality of QoS flows to the first network element, where the QoS policies each carry the association identifier.

According to a third aspect, an embodiment of this application provides a communication apparatus. The apparatus may be a first network element (for example, an access network device or a user plane network element), or may be a chip used in the first network element. The apparatus has a function of implementing the first aspect or the possible implementation methods of the first aspect. The function may be implemented by using hardware, or may be implemented by the hardware executing corresponding software. The hardware or the software includes one or more modules corresponding to the foregoing function.

According to a fourth aspect, an embodiment of this application provides a communication apparatus. The apparatus may be a session management network element, or may be a chip used in the session management network element. The apparatus has a function of implementing the second aspect or the possible implementation methods of the second aspect. The function may be implemented by using hardware, or may be implemented by the hardware executing corresponding software. The hardware or the software includes one or more modules corresponding to the foregoing function.

According to a fifth aspect, an embodiment of this application provides a communication apparatus, including a processor and a memory. The memory is configured to store computer-executable instructions. When the apparatus runs, the processor executes the computer-executable instructions stored in the memory, so that the apparatus performs the methods in the first aspect and the second aspect and any method in the possible implementation methods of the first aspect and the second aspect.

According to a sixth aspect, an embodiment of this application provides a communication apparatus, including a unit or a means configured to perform the steps in the methods in the first aspect and the second aspect and any method in the possible implementation methods of the first aspect and the second aspect.

According to a seventh aspect, an embodiment of this application provides a communication apparatus, including a processor and an interface circuit. The processor is configured to communicate with another apparatus through the interface circuit, and perform the methods in the first aspect and the second aspect and any method in the possible implementation methods of the first aspect and the second aspect. There are one or more processors.

According to an eighth aspect, an embodiment of this application provides a communication apparatus, including a processor. The processor is configured to be connected to a memory, and invoke a program stored in the memory, to perform the methods in the first aspect and the second aspect and any method in the possible implementation methods of the first aspect and the second aspect. The memory may be located inside the apparatus, or may be located outside the apparatus. In addition, there are one or more processors.

According to a ninth aspect, an embodiment of this application further provides a computer-readable storage medium. The computer-readable storage medium stores instructions. When the instructions are run on a computer, a processor is enabled to perform the methods in the first aspect and the second aspect and any method in the possible implementation methods of the first aspect and the second aspect.

According to a tenth aspect, an embodiment of this application further provides a computer program product. The computer product includes a computer program. When the computer program is run, the methods in the first aspect and the second aspect and any method in the possible implementation methods of the first aspect and the second aspect are enabled to be performed.

According to an eleventh aspect, an embodiment of this application further provides a chip system, including a processor. The processor is configured to perform the methods in the first aspect and the second aspect and any method in the possible implementation methods of the first aspect and the second aspect.

According to a twelfth aspect, an embodiment of this application further provides a communication system, including a session management network element and a first network element. The session management network element is configured to: obtain an association identifier of a first application, where the association identifier is for associating different quality of service QoS flows of the first application; and send the association identifier to the first network element. The first network element is configured to: receive the association identifier from the session management network element; and perform joint scheduling on the plurality of QoS flows of the first application that each carry the association identifier.

According to a thirteenth aspect, an embodiment of this application further provides a communication method, including: A session management network element obtains an association identifier of a first application, where the association identifier is for associating different quality of service QoS flows of the first application. The session management network element sends the association identifier to a first network element. The first network element receives the association identifier from the session management network element. The first network element performs joint scheduling on the plurality of QoS flows of the first application that each carry the association identifier.

BRIEF DESCRIPTION OF DRAWINGS

FIG. 2(*b*) is a schematic diagram of a 5G network architecture that is based on point-to-point interfaces;

DESCRIPTION OF EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more.

Figure 1:
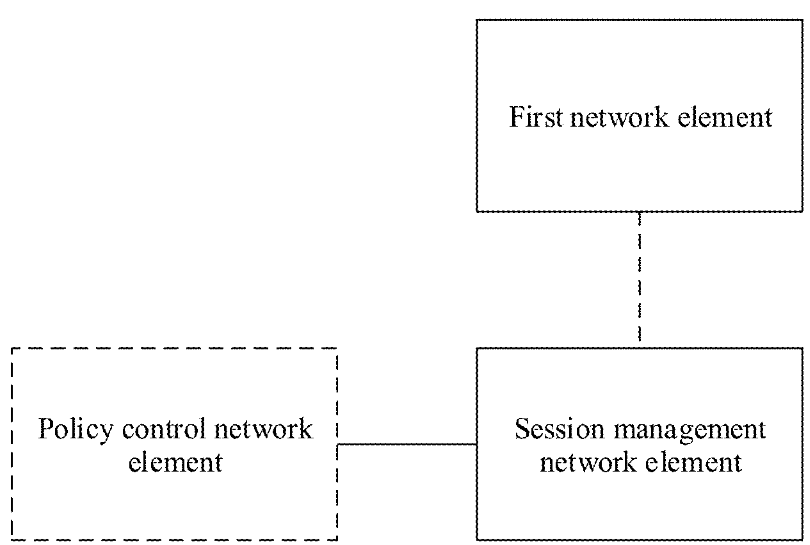
FIG. 1 is a schematic diagram of a communication system according to an embodiment of this application.

To resolve the problem mentioned in the background, as shown in FIG. 1, this application provides a communication system. The system includes a first network element and a session management network element. Optionally, the system further includes a policy control network element.

The session management network element is configured to: obtain an association identifier of a first application, where the association identifier is for associating different quality of service QoS flows of the first application; and send the association identifier to the first network element. The first network element is configured to: receive the association identifier from the session management network element; and perform joint scheduling on the plurality of QoS flows of the first application that each carry the association identifier.

In a possible implementation method, the first network element is further configured to receive first indication information from the session management network element. When performing joint scheduling on the plurality of QoS flows of the first application that each carry the association identifier, the first network element is specifically configured to perform joint scheduling on the plurality of QoS flows based on the first indication information.

In a possible implementation method, the first network element is a user plane network element. When performing joint scheduling on the plurality of QoS flows of the first application that each carry the association identifier, the first network element is specifically configured to: receive data packets of the first application; classify the data packets of the first application into the plurality of QoS flows; and continuously send the plurality of QoS flows to an access network device; send the plurality of QoS flows to an access network device within a time window of preset duration; or send the plurality of QoS flows to an access network device, where a sending time interval between any two continuously sent QoS flows in the plurality of QoS flows does not exceed a first time threshold.

In a possible implementation method, the first network element is an access network device. When performing joint scheduling on the plurality of QoS flows of the first application that each carry the association identifier, the first network element is specifically configured to: accept the plurality of QoS flows from a user plane network element; or reject the plurality of QoS flows from a user plane network element.

In a possible implementation method, the first network element is an access network device. When performing joint scheduling on the plurality of QoS flows of the first application that each carry the association identifier, the first network element is specifically configured to: receive at least two QoS flows from a user plane network element, where the at least two QoS flows include the plurality of QoS flows of the first application; and map, to a first radio bearer, a QoS flow that is in the at least two QoS flows and that carries a first QoS flow identifier and the association identifier.

In a possible implementation method, the first network element is the access network device. The first network element is further configured to map, to a second radio bearer, a QoS flow that is in the at least two QoS flows and that carries a second QoS flow identifier and the association identifier.

In a possible implementation method, the first network element is the access network device. The first network element is further configured to map, to a third radio bearer, a QoS flow that is in the at least two QoS flows and that does not carry the association identifier.

In a possible implementation method, the first network element is an access network device. When performing joint scheduling on the plurality of QoS flows of the first application that each carry the association identifier, the first network element is specifically configured to: receive the plurality of QoS flows from a user plane network element; and send the plurality of QoS flows to a terminal device based on sending proportions respectively corresponding to priorities of the different QoS flows in the plurality of QoS flows.

In a possible implementation method, when receiving the association identifier of the first application from the session management network element, the first network element is specifically configured to receive QoS policies of the plurality of QoS flows from the session management network element, where the QoS policies each carry the association identifier.

In a possible implementation method, when obtaining the association identifier of the first application, the session management network element is specifically configured to: obtain subscription data of a terminal device from the policy control network element, where the subscription data includes information about the first application, and the information about the first application includes an identifier of the first application and the association identifier; or obtain subscription data of a terminal device from the policy control network element, where the subscription data includes information about the first application, and the information about the first application includes an identifier of the first application and second indication information; and generate the association identifier based on the second indication information.

In a possible implementation method, when sending the association identifier to the first network element, the session management network element is specifically configured to send QoS policies of the plurality of QoS flows to the first network element, where the QoS policies each carry the association identifier.

Specific implementations of the foregoing solutions are described in detail in the following method embodiments. Details are not described herein again.

Figure 2A:
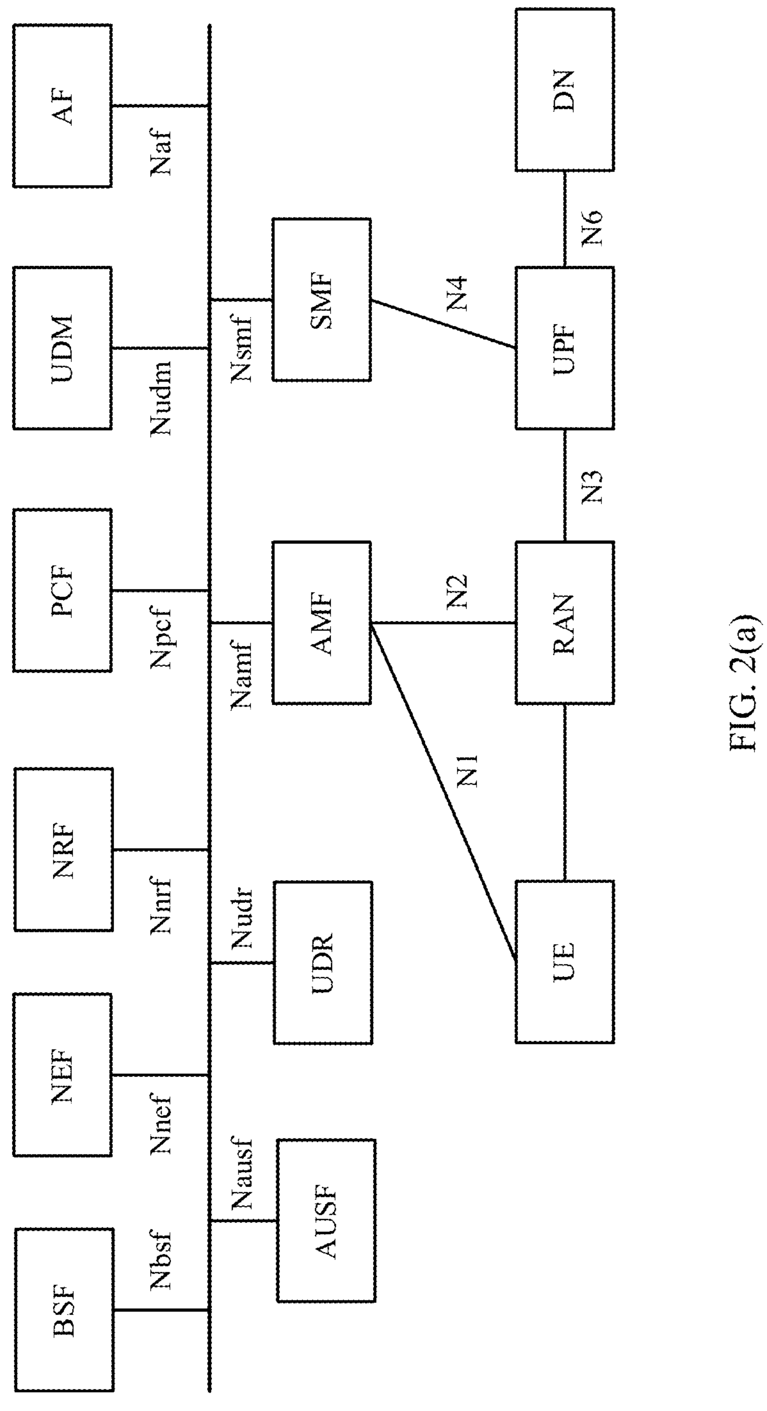
FIG. 2(*a*) is a schematic diagram of a 5G network architecture that is based on a service-based architecture.
Figure 2B:
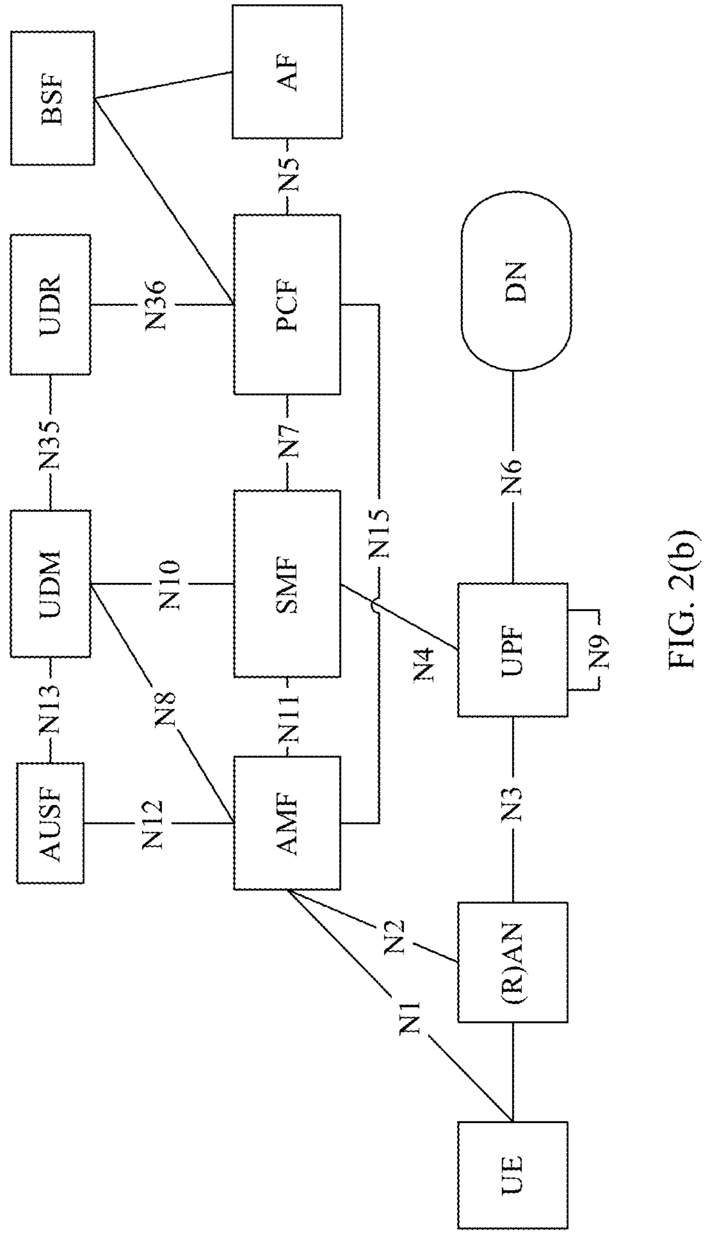

The system shown in FIG. 1 may be used in a fifth generation (5G) network architecture shown in FIG. 2 (*a*) or FIG. 2 (*b*), or certainly may be used in a future network architecture, for example, a sixth generation (6G) network architecture. This is not limited in this application.

For example, it is assumed that the communication system shown in FIG. 1 is used in the 5G network architecture. FIG. 2(*a*) is a schematic diagram of a 5G network architecture that is based on a service-based architecture. A network element or an entity corresponding to the policy control network element in FIG. 1 may be a policy control function (PCF) network element in the 5G network architecture shown in FIG. 2(*a*), and a network element or an entity corresponding to the first network element in FIG. 1 may be a user plane function (UPF) network element or a radio access network (RAN) device in the 5G network architecture shown in FIG. 2(*a*). A network element or an entity corresponding to the session management network element in FIG. 1 may be a session management function (SMF) network element in the 5G network architecture shown in FIG. 2(*a*).

The 5G network architecture shown in FIG. 2(*a*) may include three parts: a terminal device, a data network (DN), and a carrier network. The following briefly describes functions of some network elements.

The carrier network may include one or more of the following network elements: an authentication server function (AUSF) network element, a network exposure function (NEF) network element, the PCF network element, a unified data management (UDM), a unified data repository (UDR), a network repository function (NRF) network element, an application function (AF) network element, an access and mobility management function (AMF) network element, the SMF network element, the RAN, the UPF network element, and the like. In the foregoing carrier network, a part other than the radio access network may be referred to as a core network.

During specific implementation, the terminal device in embodiments of this application may be a device configured to implement a wireless communication function. The terminal device may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

The terminal device may establish a connection to the carrier network through an interface (for example, N1) provided by the carrier network, and use a service such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide another service such as a data service and/or a voice service for the terminal device. A specific representation form of the third party may be specifically determined based on an actual application scenario, and is not limited herein.

The RAN is a subnet of the carrier network, and is an implementation system between a service node in the carrier network and the terminal device. To access the carrier network, the terminal device first passes through the RAN, and then may be connected to the service node in the carrier network through the RAN. The RAN device in this application is a device that provides the wireless communication function for the terminal device, and the RAN device is also referred to as an access network device. The RAN device in this application includes but is not limited to: a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmitting and receiving point (TRP), a transmitting point (TP), a mobile switching center, and the like.

The AMF network element mainly performs functions such as mobility management and access authentication/authorization. In addition, the AMF network element is responsible for transferring a user policy between the UE and the PCF.

The SMF network element mainly performs functions such as session management, execution of a control policy delivered by the PCF, UPF selection, and UE internet protocol (IP) address assignment.

The UPF network element serves as an interface UPF connecting to the data network, and implements functions such as user plane data forwarding, charging statistics based on a session/flow level, and bandwidth throttling.

The UDM network element is mainly responsible for functions such as subscription data management and user access authorization.

The UDR is mainly responsible for a function of accessing the subscription data, policy data, application data, and another type of data.

The NEF is mainly configured to support capability and event exposure.

The AF network element mainly transfers a requirement of an application side on a network side, for example, a quality of service (QoS) requirement or user status event subscription. The AF may be a third-party functional entity, or may be an application service deployed by a carrier, for example, an IP multimedia subsystem (IMS) voice call service.

The PCF network element is mainly responsible for policy control functions such as charging for a session level or a service flow level, QoS bandwidth guarantee, mobility management, and UE policy decision.

The NRF network element may be configured to provide a network element discovery function, and provide, based on a request from another network element, network element information corresponding to a network element type. The NRF further provides network element management services such as network element registration, update, deregistration, and network element status subscription and push.

The AUSF network element is mainly responsible for authenticating a user, to determine whether the user or a device is allowed to access a network.

The DN is a network outside the carrier network. The carrier network may access a plurality of DNs. A plurality of services may be deployed in the DN, and the DN may provide a service such as a data service and/or a voice service for the terminal device. For example, the DN is a private network of a smart factory, a sensor installed in a workshop of the smart factory may be the terminal device, a control server of the sensor is deployed in the DN, and the control server may serve the sensor. The sensor may communicate with the control server, to obtain instructions of the control server, transmit collected sensor data to the control server according to the instructions, and so on. For another example, the DN is an internal office network of a company, a mobile phone or a computer of an employee of the company may be the terminal device, and the mobile phone or the computer of the employee may access information, a data resource, and the like in the internal office network of the company.

Nausf, Nnef, Npcf, Nudm, Naf, Namf, Nsmf, N1, N2, N3, N4, and N6 in FIG. 2(*a*) are interface serial numbers. For meanings of the interface serial numbers, refer to meanings defined in a 3GPP standard protocol. This is not limited herein.

For example, it is assumed that the communication system shown in FIG. 1 is used in the 5G network architecture. FIG. 2(*b*) is a schematic diagram of a 5G network architecture that is based on point-to-point interfaces. A network element or an entity corresponding to the policy control network element in FIG. 1 may be a PCF network element in the 5G network architecture shown in FIG. 2(*b*). A network element or an entity corresponding to the first network element in FIG. 1 may be a UPF network element or a RAN device in the 5G network architecture shown in FIG. 2(*b*). A network element or an entity corresponding to the session management network element in FIG. 1 may be an SMF network element in the 5G network architecture shown in FIG. 2(*b*).

For descriptions of functions of network elements in FIG. 2(*b*), refer to the descriptions of the functions of the corresponding network elements in FIG. 2(*a*). Details are not described again. A main difference between FIG. 2(*b*) and FIG. 2(*a*) lies in that interfaces between the network elements in FIG. 2(*b*) are the point-to-point interfaces rather than service-oriented interfaces.

In the architecture shown in FIG. 2(*b*), names and functions of the interfaces between the network elements are as follows.

(1) N7 represents an interface between the PCF and an SMF, and is configured to deliver a protocol data unit (PDU) session granularity control policy and a service data flow granularity control policy.

(2) N15 represents an interface between the PCF and an AMF, and is configured to deliver a UE policy and an access control related policy.

(3) N5 represents an interface between an AF and the PCF, and is configured to deliver an application service request, and report a network event.

(4) N4 represents an interface between the SMF and a UPF, and is configured to transfer information between a control plane and a user plane, including delivery of a forwarding rule, a QoS control rule, a traffic statistics rule, and the like from the control plane to the user plane, and reporting of user plane information.

(5) N11 represents an interface between the SMF and the AMF, and is configured to: transfer PDU session tunnel information between the RAN and the UPF, transfer a control message to be sent to UE, transfer radio resource control information to be sent to the RAN, and so on.

(6) N2 represents an interface between the AMF and the RAN, and is configured to transfer radio bearer control information from a core network side to the RAN, and so on.

(7) N1 represents an interface between the AMF and the UE, is access-irrelevant, and is configured to transfer a QoS control rule to the UE, and so on.

(8) N8 represents an interface between the AMF and a UDM, and is used by the AMF to obtain access and mobility management related subscription data and authentication data from the UDM, used by the AMF to register current mobility management related information of the UE with the UDM, and so on.

(9) N10 represents an interface between the SMF and the UDM, and is used by the SMF to obtain session management related subscription data from the UDM, used by the SMF to register current session related information of the UE with the UDM, and so on.

(10) N35 represents an interface between the UDM and a UDR, and is used by the UDM to obtain user subscription data information from the UDR.

(11) N36 represents an interface between the PCF and the UDR, and is used by the PCF to obtain policy related subscription data and application data related information from the UDR.

(12) N12 represents an interface between the AMF and an AUSF, and is used by the AMF to initiate an authentication procedure to the AUSF, where an SUCI may be carried as a subscription identifier.

(13) N13 represents an interface between the UDM and the AUSF, and is used by the AUSF to obtain a user authentication vector from the UDM, to perform the authentication procedure.

It may be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be jointly implemented by a plurality of devices, or may be implemented by one function module in one device. This is not specifically limited in embodiments of this application.

A session management network element, a policy control network element, a user plane network element, and an access network device in this application may be respectively the SMF, the PCF, the UPF, and the RAN in FIG. 2(*a*) or FIG. 2(*b*), or may be network elements that have the functions of the SMF, the PCF, the UPF, and the RAN in a future communication network, for example, a 6th generation (6G) network. This is not limited in this application. For ease of description, in this application, descriptions are provided by using an example in which the session management network element, the policy control network element, the user plane network element, and the access network device are respectively the SMF, the PCF, the UPF, and RAN.

In embodiments of this application, that a UPF classifies a received downlink data packet into one or more QoS flows may alternatively be described as that the UPF maps the received downlink data packet to the one or more QoS flows. This is uniformly described herein. Details are not described again subsequently.

In embodiments of this application, performing joint scheduling on different QoS flows of an application means that a network element, for example, a UPF or a RAN, that performs flow scheduling or flow control schedules a part of or all QoS flows of the application as a whole, instead of separately scheduling each QoS flow of the application. The joint scheduling in embodiments of this application may alternatively be understood as unified scheduling, QoS flow scheduling at an application granularity, and the like.

Figure 3:
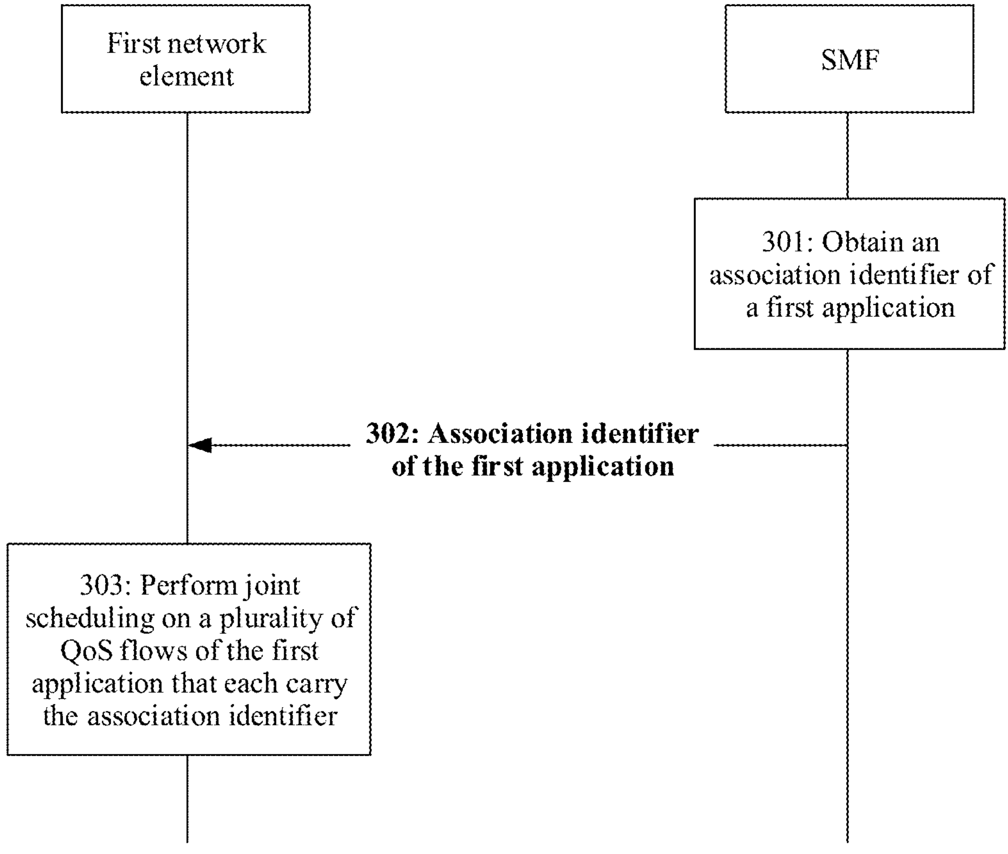
FIG. 3 is a schematic flowchart of a communication method according to an embodiment of this application.

To resolve the problem mentioned in the background, based on the network architecture shown in FIG. 2 (*a*) or FIG. 2 (*b*), as shown in FIG. 3, this application provides a communication method. In this embodiment, one association identifier (Association ID) is allocated to each application, and different association identifiers are allocated to different applications. In addition, an association relationship between each QoS flow of an application and an association identifier of the application is established. Subsequently, the UPF and the RAN may identify, based on the association identifier, different QoS flows belonging to the application, and then perform joint scheduling on the QoS flows of the application, to ensure that the QoS flows of the application can arrive at the terminal device simultaneously or a time interval between arrivals at the terminal device is small, so that the service experience of a user is improved.

The method includes the following steps.

Step 301: The SMF obtains an association identifier of a first application, where the association identifier is for associating different QoS flows of the first application.

In a first implementation method, the SMF requests to obtain subscription data of the terminal device from the PCF, and the PCF sends the subscription data of the terminal device to the SMF. The subscription data includes information about the first application, the information about the first application includes an identifier of the first application and indication information (where the indication information may also be referred to as second indication information in this embodiment of this application), and the indication information indicates to perform joint scheduling on the different QoS flows of the first application. After obtaining the subscription data of the terminal device, the SMF may obtain the indication information, and then generate the association identifier of the first application based on the indication information. The indication information recorded in the subscription data of the terminal device may be sent by the terminal device or the AF network element to the PCF, and added by the PCF to the subscription data of the terminal device.

In a second implementation method, the SMF requests to obtain subscription data of the terminal device from the PCF, and the PCF sends the subscription data of the terminal device to the SMF. The subscription data includes information about the first application, and the information about the first application includes an identifier of the first application and the association identifier of the first application. After obtaining the subscription data of the terminal device, the SMF may obtain the association identifier of the first application. The association identifier that is of the first application and that is recorded in the subscription data of the terminal device may be generated and sent to the PCF by the terminal device or the AF network element, and then added by the PCF to the subscription data of the terminal device. Alternatively, the association identifier that is of the first application and that is recorded in the subscription data of the terminal device may be generated and added to the subscription data of the terminal device by the PCF. For example, if the PCF receives indication information from the AF or the terminal device, where the indication information indicates to perform joint scheduling on the different QoS flows of the first application, the PCF generates the association identifier of the first application based on the indication information.

In a third implementation method, the PCF sends QoS policies of the plurality of QoS flows of the first application to the SMF, where each QoS policy includes the association identifier of the first application. The association identifier of the first application may be generated by the PCF. For example, if the PCF receives indication information from the AF or the terminal device, where the indication information indicates to perform joint scheduling on the different QoS flows of the first application, the PCF generates the association identifier of the first application based on the indication information. Alternatively, the association identifier of the first application may be sent by the AF or the terminal device to the PCF.

Step 302: The SMF sends the association identifier of the first application to a first network element. Accordingly, the first network element may receive the association identifier of the first application.

The first network element herein may be the UPF or the RAN.

In an implementation method, the SMF may send a QoS policy of each QoS flow of the first application to the first network element, where the QoS policy includes the association identifier of the first application. The association identifier of the first application in the QoS policy may be added by the SMF, or may be added by the PCF. In this way, the first network element may obtain the association identifier of the first application from the QoS policy of the QoS flow of the first application, and perform joint scheduling on a plurality of data flows of the first application that each carry the association identifier.

Step 303: The first network element performs joint scheduling on the plurality of QoS flows of the first application that each carry the association identifier.

Based on the foregoing solution, the first network element can identify, based on the association identifier, QoS flows belonging to a same application, and perform joint scheduling, and it is ensured that the QoS flows of the same application can arrive at the terminal device simultaneously or a time interval between arrivals at the terminal device is small, so that the service experience of the user can be improved. However, in a conventional technology, the first network element can only identify different QoS flows, but cannot learn whether there is an internal relationship between the different QoS flows, that is, cannot identify whether the different QoS flows belong to a same application. Consequently, joint scheduling cannot be implemented.

Because there are a plurality of manners of performing joint scheduling on the QoS flows of the first application by the first network element, in this embodiment of this application, the SMF may indicate the manners of performing joint scheduling on the QoS flows of the first application by the first network element.

In a first implementation method, when the SMF sends the association identifier of the first application to the first network element, the association identifier may indicate to perform joint scheduling on the plurality of QoS flows of the first application that each carry the association identifier, and may further indicate a specific joint scheduling manner. Therefore, the association identifier has both functions of being for associating the different QoS flows of the first application and indicating the joint scheduling manner.

In a second implementation method, when/before/after sending the association identifier of the first application to the first network element in step 302, the SMF further sends a piece of indication information (where the indication information is also referred to as first indication information in this embodiment of this application) to the first network element additionally, where the indication information indicates to perform joint scheduling on the plurality of QoS flows of the first application that each carry the association identifier, and may further indicate a specific joint scheduling manner. The indication information herein may be referred to as a scheduling indication, an operation indication, or the like. It should be noted that the first indication information in this embodiment of this application and the foregoing second indication information may be same indication information, or may be different indication information.

The following separately describes the foregoing two different indication manners.

In the first implementation method, the association identifier of the first application indicates to perform joint scheduling on the plurality of QoS flows of the first application that each carry the association identifier.

The following separately describes implementations that are used when the first network element is the UPF or the RAN and that are of performing joint scheduling on the plurality of QoS flows of the first application that each carry the association identifier.

Case 1: The first network element is the UPF.

When the first network element is the UPF, that the association identifier that is of the first application and that is received by the UPF indicates to perform joint scheduling on the plurality of QoS flows of the first application that each carry the association identifier may be specifically indicating to continuously send the plurality of QoS flows of the first application.

It should be noted that how the UPF continuously sends the plurality of QoS flows of the first application specifically may be determined by the UPF based on implementation. In an example, the following provides three different specific implementation methods for continuous sending.

Method 1: After receiving data packets of the first application from the AF or another network element, the UPF classifies the data packets of the first application into the plurality of QoS flows of the first application, where each QoS flow includes one QFI and the association identifier of the first application. Then, the UPF continuously sends the plurality of QoS flows of the first application to the RAN, to ensure that the different QoS flows of the first application can arrive at the RAN simultaneously or a time difference between arrivals at the RAN is small.

"A time difference is small" herein means that the time difference is less than a preset threshold or a value of the time difference needs to not affect user experience. That is, the time difference between the arrivals of the different QoS flows of the first application at the RAN needs to be small sufficiently, so that user experience is not affected. It should be noted that, for an explanation of "a time difference between arrivals at the RAN is small" in another part of this embodiment of this application, refer to the descriptions herein. Unified descriptions are provided herein. Details are not described again subsequently.

Method 2: After receiving data packets of the first application from the AF or another network element, the UPF classifies the data packets of the first application into the plurality of QoS flows of the first application, where each QoS flow includes one QFI and the association identifier of the first application. Then, the UPF sends the plurality of QoS flows of the first application to the RAN within a time window of preset duration, to ensure that a time difference between arrivals of the different QoS flows of the first application at the RAN is small. The time window of the preset duration herein may be preconfigured on the UPF, or received by the UPF from a network management system or another network element.

Method 3: After receiving data packets of the first application from the AF or another network element, the UPF maps the data packets of the first application to the plurality of QoS flows of the first application, where each QoS flow includes one QFI and the association identifier of the first application. Then, the UPF sends the plurality of QoS flows of the first application to the RAN, and it is ensured that a sending time interval between any two continuously sent QoS flows in the plurality of QoS flows does not exceed a first time threshold during sending, to ensure that a time difference between arrivals of the different QoS flows of the first application at the RAN is small. The first time threshold herein may be preconfigured on the UPF, or received by the UPF from a network management system or another network element.

The following describes Method 1 to Method 3 in Case 1 with reference to an example.

For example, the first application is an application in a tactile internet, and the QoS flows of the first application include three types of QoS flows: a tactile QoS flow, a visual QoS flow, and an audio QoS flow.

After receiving downlink data packets of the first application, the UPF encapsulates downlink data packets with a same reliability requirement into a same QoS flow. For example, the downlink data packets are mapped to the following QoS flow 1 to QoS flow 10.

Tactile QoS flows include the QoS flow 1 (an association ID 1 and a QFI 1), the QoS flow 2 (the association ID 1 and the QFI 1), and the QoS flow 3 (the association ID 1 and the QFI 1).

Visual QoS flows include the QoS flow 4 (the association ID 1 and a QFI 2), the QoS flow 5 (the association ID 1 and the QFI 2), the QoS flow 6 (the association ID 1 and the QFI 2), and the QoS flow 7 (the association ID 1 and the QFI 2).

Audio QoS flows include the QoS flow 8 (the association ID 1 and a QFI 3), the QoS flow 9 (the association ID 1 and the QFI 3), and the QoS flow 10 (the association ID 1 and the QFI 3).

The QoS flow 1 to the QoS flow 10 each carry the association ID 1, the QoS flow 1 to the QoS flow 3 each carry the QFI 1, the QoS flow 4 to the QoS flow 7 each carry the QFI 2, and the QoS flow 8 to the QoS flow 10 each carry the QFI 3. The association ID 1 is the association identifier of the first application.

Then, the UPF sends the QoS flow 1 to the QoS flow 10 to the RAN.

If Method 1 is used, the UPF continuously sends the QoS flow 1 to the QoS flow 10 to the RAN.

If Method 2 is used, the UPF sends the QoS flow 1 to the QoS flow 10 to a RAN within the time window of the preset duration. Therefore, when the UPF sends the 10 QoS flows, the 10 QoS flows may not be sent continuously, but a total duration of sending the 10 QoS flows does not exceed the time window of the preset duration.

If Method 3 is used, the UPF sends the QoS flow 1 to the QoS flow 10 to the RAN, and a sending time interval between any two continuously sent QoS flows in the plurality of QoS flows does not exceed the first time threshold. Therefore, when the UPF sends the 10 QoS flows, the 10 QoS flows may not be sent continuously, or total duration of the 10 QoS flows may exceed a time window of preset duration. However, a sending time interval between any two continuously sent QoS flows does not exceed a first time threshold.

Case 2: The first network element is the RAN.

When the first network element is the RAN, the association identifier that is of the first application and that is received by the RAN may include but is not limited to the following three manners of indicating the joint scheduling.

Implementation method 1: The association identifier of the first application indicates that objects on which joint scheduling is to be performed are the plurality of QoS flows of the first application.

Alternatively, it is understood that the association identifier of the first application indicates to accept or reject all QoS flows of the first application. That is, the association identifier of the first application indicates the RAN to accept or reject all the QoS flows of the first application.

Based on the implementation method, the RAN may perform data flow admission control. Because a capability of the RAN is limited, the RAN sometimes does not accept all downlink QoS flows from the UPF, and may discard some low-priority QoS flows based on QoS priorities. When the RAN receives downlink QoS flows from the UPF, the RAN may determine, by using the association identifier, that two or more QoS flows belong to a same application, and does not accept or reject only one of the QoS flows, but accepts or rejects all QoS flows, to ensure that QoS flows belonging to a same application can arrive at the terminal device simultaneously.

For example, when the UPF sends the plurality of QoS flows of the first application to the RAN, if the current load of the RAN is heavy, the RAN determines, based on the association identifier, to reject all the QoS flows of the first application. If the current load of the RAN is light or normal, the RAN determines, based on the association identifier, that all the QoS flows of the first application may be accepted. That is, the RAN does not discard the QoS flows of the first application. In this way, it is ensured that the different QoS flows of the first application can arrive at the terminal device simultaneously, or a time difference between arrivals at the terminal device is small.

Implementation method 2: The association identifier of the first application indicates to map, to at least one radio bearer, a QoS flow that is in at least two received QoS flows and that carries a first QoS flow identifier (first QFI) and the association identifier of the first application. Optionally, the association identifier of the first application further indicates to map, to a radio bearer different from the at least one radio bearer, a QoS flow that is in the at least two QoS flows and that does not carry the association identifier of the first application, where the at least two QoS flows include the plurality of QoS flows of the first application.

Alternatively, it is understood that the association identifier of the first application indicates the RAN to map QoS flows from a same application and with a same QFI to one or more radio bearers, and optionally, further indicates the RAN to map, to another radio bearer, QoS flows from different applications.

For example, after receiving the at least two QoS flows (which may be from the same application or the different applications), the RAN maps, to the first radio bearer, the QoS flow that is in the at least two QoS flows and that carries the first QFI and the association identifier of the first application. The first radio bearer herein may be one or more radio bearers. That is, the RAN maps, to the one or more radio bearers, the QoS flows from the same application and with the same QFI, to ensure that QFIs of QoS flows on a same radio bearer are the same and the QoS flows belong to the same application, so that joint scheduling can be performed on the QoS flows of the same application.

Optionally, the RAN may further map, to a second radio bearer, a QoS flow that is in the at least two received QoS flows and that carries a second QFI and the association identifier of the first application. The second radio bearer herein may be one or more radio bearers, and the second radio bearer is different from the first radio bearer. That is, QoS flows from a same application (that is, with a same association identifier) and with different QFIs are mapped to different radio bearers. A reason is that QoS flows with a same QFI have basically consistent service quality requirements, and therefore are mapped to a same radio bearer as much as possible; while QoS flows with different QFIs may have inconsistent service quality requirements, and therefore are mapped to different radio bearers as much as possible.

Optionally, the RAN may further map, to a third radio bearer, the QoS flow that is in the at least two received QoS flows and that does not carry the association identifier of the first application. The third radio bearer herein may be one or more radio bearers, and the third radio bearer is different from both the first radio bearer and the second radio bearer. That is, the RAN maps, to different radio bearers, QoS flows from different applications (that is, with different association identifiers). In this scheduling manner, one radio bearer has a QoS flow of only one application, and does not have QoS flows of two applications. This can avoid a case in which no data of QoS flows of two or more applications can be transferred when one radio bearer is faulty, so that impact of a fault on the different applications can be reduced.

Subsequently, the RAN sends the at least two QoS flows to the terminal device by using one or more of the first radio bearer, the second radio bearer, and the third radio bearer. That is, the RAN maps the received QoS flows from the same application or the different applications to one or more radio bearers according to the foregoing method, and then sends the QoS flows to the terminal device by using the radio bearer.

The following describes Implementation method 2 in Case 2 with reference to an example.

For example, the first application and a second application are two different applications in a tactile internet, and the QoS flows of the first application include three types of QoS flows: a tactile QoS flow, a visual QoS flow, and an audio QoS flow. QoS flows of the second application include three types of QoS flows: a tactile QoS flow, a visual QoS flow, and an audio QoS flow.

For example, the UPF receives both downlink data packets of the first application and downlink data packets of the second application.

After receiving the downlink data packets of the first application, the UPF encapsulates downlink data packets with a same reliability requirement into a same QoS flow. For example, the downlink data packets are mapped to the following QoS flow 1 to QoS flow 10.

Tactile QoS flows include the QoS flow 1 (an association ID 1 and a QFI 1), the QoS flow 2 (the association ID 1 and the QFI 1), and the QoS flow 3 (the association ID 1 and the QFI 1).

Visual QoS flows include the QoS flow 4 (the association ID 1 and a QFI 2), the QoS flow 5 (the association ID 1 and the QFI 2), the QoS flow 6 (the association ID 1 and the QFI 2), and the QoS flow 7 (the association ID 1 and the QFI 2).

Audio QoS flows include the QoS flow 8 (the association ID 1 and a QFI 3), the QoS flow 9 (the association ID 1 and the QFI 3), and the QoS flow 10 (the association ID 1 and the QFI 3).

The QoS flow 1 to the QoS flow 10 each carry the association ID 1, the QoS flow 1 to the QoS flow 3 each carry the QFI 1, the QoS flow 4 to the QoS flow 7 each carry the QFI 2, and the QoS flow 8 to the QoS flow 10 each carry the QFI 3. The association ID 1 is the association identifier of the first application.

Then, the UPF sends the QoS flow 1 to the QoS flow 10 to the RAN.

After receiving the downlink data packets of the second application, the UPF encapsulates downlink data packets with a same reliability requirement into a same QoS flow. For example, the downlink data packets are mapped to the following QoS flow 11 to QoS flow 20.

Tactile QoS flows include the QoS flow 11 (an association ID 2 and the QFI 1), the QoS flow 12 (the association ID 2 and the QFI 1), and the QoS flow 13 (the association ID 2 and the QFI 1).

Visual QoS flows include the QoS flow 14 (the association ID 2 and the QFI 2), the QoS flow 15 (the association ID 2 and the QFI 2), the QoS flow 16 (the association ID 2 and the QFI 2), and the QoS flow 17 (the association ID 2 and the QFI 2).

Audio QoS flows include the QoS flow 18 (the association ID 2 and the QFI 3), the QoS flow 19 (the association ID 2 and the QFI 3), and the QoS flow 20 (the association ID 2 and the QFI 3).

The QoS flow 11 to the QoS flow 20 each carry the association ID 2, the QoS flow 11 to the QoS flow 13 each carry the QFI 1, the QoS flow 14 to the QoS flow 17 each carry the QFI 2, and the QoS flow 18 to the QoS flow 20 each carry the QFI 3. The association ID 2 is an association identifier of the second application.

Then, the UPF sends the QoS flow 11 to the QoS flow 20 to the RAN.

After the RAN receives at least two of the QoS flow 1 to the QoS flow 20, a mapping policy is as follows: The QoS flow 1 to the QoS flow 3 are mapped to a radio bearer 1, the QoS flow 4 to the QoS flow 7 are mapped to a radio bearer 2, the QoS flow 8 to the QoS flow 10 are mapped to a radio bearer 3, the QoS flow 11 to the QoS flow 13 are mapped to a radio bearer 4, the QoS flow 14 to the QoS flow 17 are mapped to a radio bearer 5, and the QoS flow 18 to the QoS flow 20 are mapped to a radio bearer 6.

It should be noted that, if there are a large quantity of QoS flows that need to be mapped to a same radio bearer or data packets of the QoS flows are large, the QoS flows may alternatively be mapped to a plurality of radio bearers. For example, the QoS flow 1 to the QoS flow 3 may be mapped to two radio bearers: a radio bearer 11 and a radio bearer 12.

It can be learned that the QoS flows on the same radio bearer carry a same QFI and a same association identifier. QoS flows on different radio bearers carry different association identifiers. In this way, QoS flows of a same application are not transmitted on the same radio bearer, to avoid a case in which data of a plurality of applications cannot be transmitted because one radio bearer is faulty or congested.

Implementation method 3: The association identifier of the first application indicates to send the plurality of QoS flows of the first application based on sending proportions respectively corresponding to priorities of the different QoS flows in the plurality of QoS flows of the first application.

For example, after receiving the plurality of data flows of the first application from the UPF, the RAN sends the plurality of QoS flows of the first application to the terminal device based on the sending proportions respectively corresponding to the priorities of the different QoS flows in the plurality of QoS flows.

According to a conventional technology, the RAN first forwards a high-priority QoS flow based on a QFI priority, and forwards a low-priority QoS flow only after forwarding of the high-priority QoS flow ends. Consequently, the terminal device may not be able to receive, in real time, QoS flows belonging to a same application. This causes an unpacking failure. However, in this embodiment of this application, based on a scheduling policy in Implementation method 3, the RAN may identify a plurality of different QoS flows of the same application based on an association identifier, then set a proportion based on priorities of the different QoS flows, and keep concurrent transmission that is of the different QoS flows belonging to the same application and that is performed based on a specific proportion. This can avoid a case in which a next-priority QoS flow starts, after transmission of the high-priority QoS flow ends, to be transferred. In an example, an application includes a QoS flow 1, a QoS flow 2, and a QoS flow 3, a priority of the QoS flow 1 is higher than a priority of the QoS flow 2, and the priority of the QoS flow 2 is higher than a priority of the QoS flow 3. In this case, it may be set that within a same time period, traffic of the QoS flow 1 accounts for 50% of total traffic, traffic of the QoS flow 2 accounts for 30% of the total traffic, and traffic of the QoS flow 3 accounts for 20% of the total traffic.

In the second implementation method, the indication information (namely, the first indication information) indicates to perform joint scheduling on the plurality of QoS flows of the first application that each carry the association identifier.

A main difference between the second implementation method and the first implementation method is as follows: In the first implementation method, there is no indication information, and the association identifier of the first application indicates to perform joint scheduling on the plurality of QoS flows of the first application that each carry the association identifier; while in the second implementation method, a single piece of indication information indicates to perform joint scheduling on the plurality of QoS flows of the first application that each carry the association identifier.

Specific implementation methods of the indication information are similar to the implementation methods of the association identifier of the first application in the first implementation method. The following briefly describes different implementation methods of the indication information. For specific implementation details of the different implementation methods, refer to the descriptions in the first implementation method. Details are not described herein again.

The following separately describes implementations that are used when the first network element is the UPF or the RAN and that are of performing joint scheduling on the plurality of QoS flows of the first application that each carry the association identifier.

Case 1: The first network element is the UPF.

When the first network element is the UPF, that the indication information received by the UPF indicates to perform joint scheduling on the plurality of QoS flows of the first application that each carry the association identifier may be specifically indicating to continuously send the plurality of QoS flows of the first application.

It should be noted that how the UPF continuously sends the plurality of QoS flows of the first application specifically may be determined by the UPF based on implementation. For a specific implementation method and an example, refer to the related descriptions in the first implementation method.

Case 2: The first network element is the RAN.

When the first network element is the RAN, the indication information received by the RAN may include but is not limited to the following three specific manners of indicating the joint scheduling.

Implementation method 1: The indication information indicates that objects on which joint scheduling is to be performed are the plurality of QoS flows of the first application.

Alternatively, it is understood that the indication information indicates to accept or reject all QoS flows of the first application. That is, the indication information indicates the RAN to accept or reject all the QoS flows of the first application. For a specific implementation method and an example, refer to the related descriptions in the first implementation method.

Implementation method 2: The indication information indicates to map, to at least one radio bearer, a QoS flow that is in at least two received QoS flows and that carries a first QoS flow identifier (first QFI) and the association identifier of the first application. Optionally, the indication information further indicates to map, to a radio bearer different from the at least one radio bearer, a QoS flow that is in the at least two QoS flows and that does not carry the association identifier of the first application, where the at least two QoS flows include the plurality of QoS flows of the first application.

Alternatively, it is understood that the indication information indicates the RAN to map QoS flows from a same application and with a same QFI to one or more radio bearers, and optionally, further indicates the RAN to map, to another radio bearer, QoS flows from different applications. For a specific implementation method and an example, refer to the related descriptions in the first implementation method.

Implementation method 3: The indication information indicates to send the plurality of QoS flows of the first application based on sending proportions respectively corresponding to priorities of the different QoS flows in the plurality of QoS flows of the first application.

After receiving the plurality of data flows of the first application from the UPF, the RAN sends the plurality of QoS flows of the first application to the terminal device based on the sending proportions respectively corresponding to the priorities of the different QoS flows in the plurality of QoS flows. For a specific implementation method and an example, refer to the related descriptions in the first implementation method.

With reference to a specific example, the following describes the communication method shown in FIG. 3.

Figure 4A:
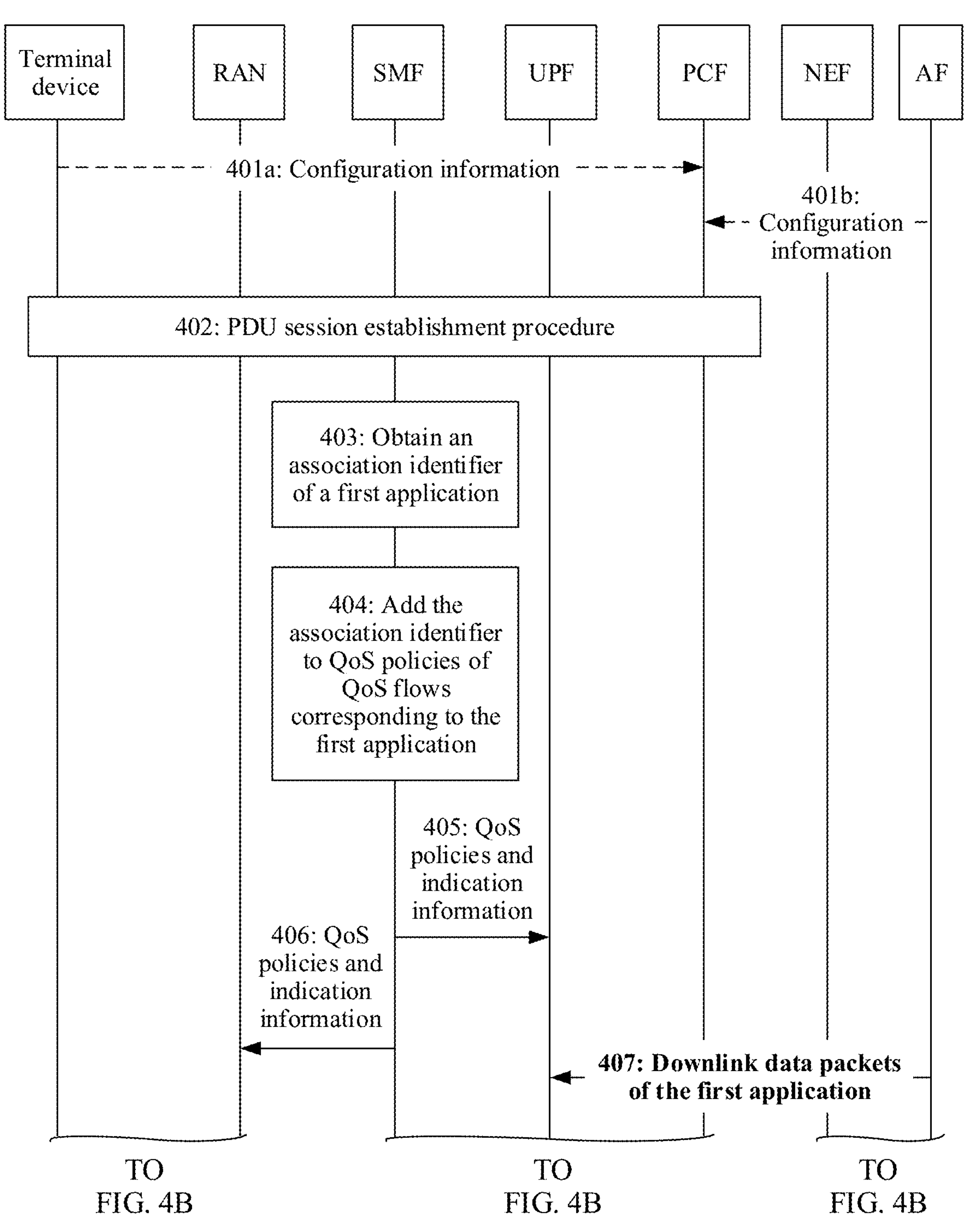
FIG. 4A and FIG. 4B are a schematic flowchart of another communication method according to an embodiment of this application.
Figure 4B:
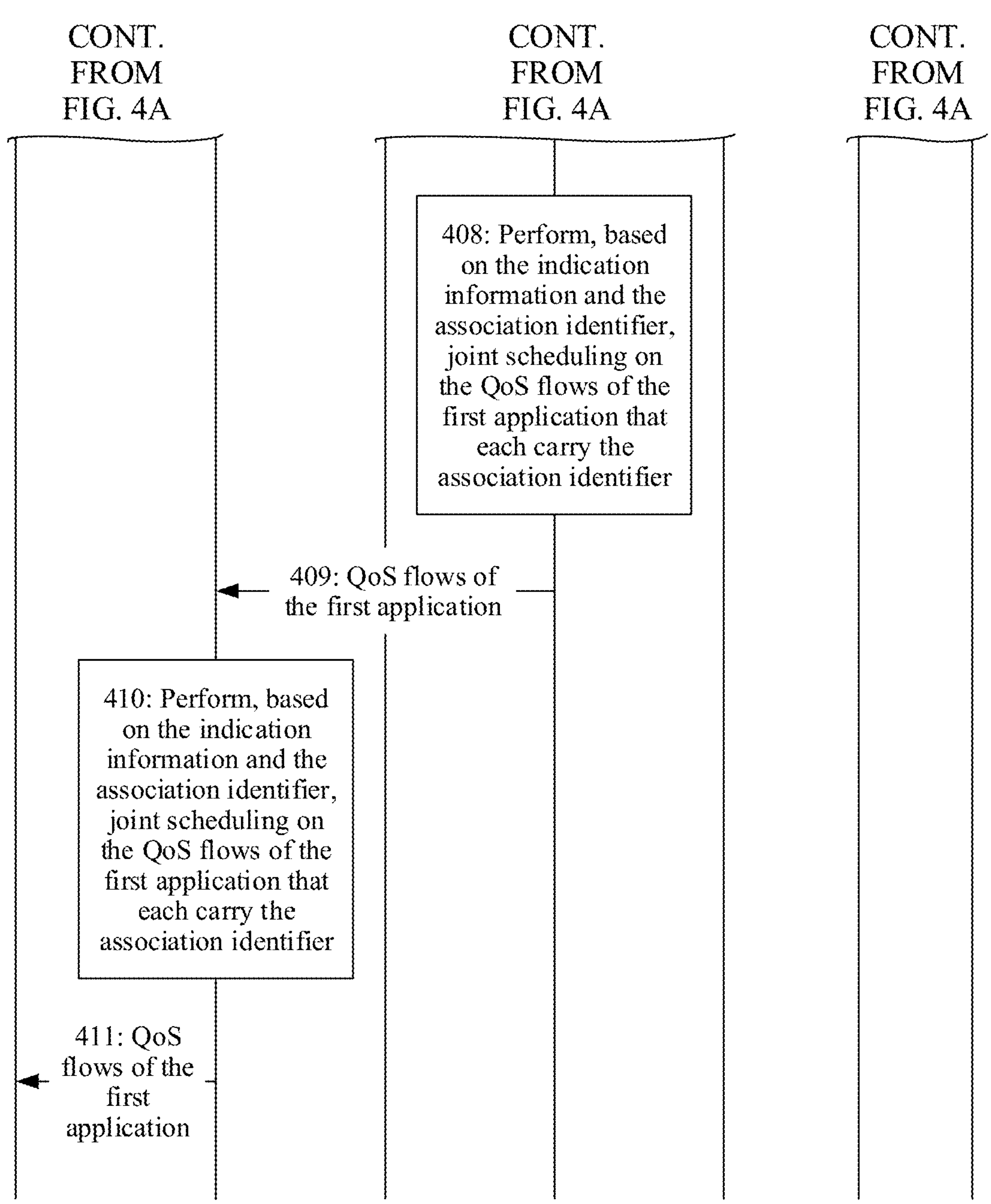

FIG. 4A and FIG. 4B are a flowchart of another communication method according to an embodiment of this application. In this embodiment, one association identifier (Association ID) is allocated to each application, and different association identifiers are allocated to different applications. In addition, an association relationship between each QoS flow of an application and an association identifier of the application is established. Subsequently, a UPF and a RAN may identify, based on the association identifier, different QoS flows belonging to the application, and then perform joint scheduling on the QoS flows of the application, to ensure that the QoS flows of the application can arrive at a terminal device simultaneously or a time interval between arrivals at the terminal device is small, so that the service experience of a user is improved.

This embodiment is performed in a PDU session establishment procedure. The method includes the following steps.

Step 401*a*: The terminal device sends configuration information to a PCF. Accordingly, the PCF may receive the configuration information.

In an implementation method, the configuration information includes indication information (which may be referred to as second indication information in this embodiment of this application) and an identifier of a first application, and the indication information indicates to perform joint scheduling on a plurality of QoS flows of the first application. After receiving the configuration information, the PCF stores the indication information in subscription data of the terminal device, and specifically, stores the indication information in information about the first application in the subscription data. That is, the subscription data of the terminal device includes the information about the first application, and the information about the first application includes at least the identifier of the first application and the indication information.

In another implementation method, the configuration information includes an association identifier of a first application and an identifier of the first application, and the association identifier indicates to perform joint scheduling on a plurality of QoS flows of the first application that each carry the association identifier. After receiving the configuration information, the PCF stores the association identifier of the first application in subscription data of the terminal device, and specifically, stores the association identifier of the first application in information about the first application in the subscription data. That is, the subscription data of the terminal device includes the information about the first application, and the information about the first application includes at least the identifier of the first application and the association identifier of the first application. In the implementation method, the association identifier of the first application is allocated by the terminal device.

Step 401*a* is an optional step.

Step 401*b*: An AF sends configuration information to a PCF. Accordingly, the PCF may receive the configuration information.

In an implementation method, the configuration information includes indication information (which may be referred to as second indication information in this embodiment of this application) and an identifier of a first application, and the indication information indicates to perform joint scheduling on a plurality of QoS flows of the first application. After receiving the configuration information, the PCF stores the indication information in subscription data of the terminal device, and specifically, stores the indication information in information about the first application in the subscription data. That is, the subscription data of the terminal device includes the information about the first application, and the information about the first application includes at least the identifier of the first application and the indication information.

In another implementation method, the configuration information includes an association identifier of a first application and an identifier of the first application, and the association identifier indicates to perform joint scheduling on a plurality of QoS flows of the first application that each carry the association identifier. After receiving the configuration information, the PCF stores the association identifier of the first application in subscription data of the terminal device, and specifically, stores the association identifier of the first application in information about the first application in the subscription data. That is, the subscription data of the terminal device includes the information about the first application, and the information about the first application includes at least the identifier of the first application and the association identifier of the first application. In the implementation method, the association identifier of the first application is allocated by the AF.

Step 401*b* is an optional step.

During actual application, either of step 401*a* and step 401*b* needs to be performed. That is, step 401*a* or step 401*b* is performed.

Step 402: PDU session establishment procedure.

This process is a PDU session establishment procedure in a conventional technology, and the terminal device may establish a PDU session with a network side.

Step 403: An SMF obtains the association identifier of the first application.

In an implementation method, the SMF requests to obtain the subscription data of the terminal device from the PCF, and the PCF sends the subscription data of the terminal device to the SMF. The subscription data includes the information about the first application, and the information about the first application includes the identifier of the first application. Optionally, the information about the first application further includes the association identifier of the first application or the indication information.

If the information about the first application includes the association identifier of the first application, the SMF may obtain the association identifier of the first application from the information about the first application. If the information about the first application includes the indication information, the SMF generates the association identifier of the first application based on the indication information in the information about the first application.

Step 404: The SMF adds the association identifier of the first application to QoS policies of the QoS flows of the first application.

Step 405: The SMF sends indication information and the QoS policies of the different QoS flows of the first application to the UPF. Accordingly, the UPF may receive the indication information and the QoS policies of the different QoS flows of the first application.

The UPF may obtain the association identifier of the first application from a QoS policy of each QoS flow of the first application, and perform, based on the indication information, joint scheduling on a plurality of data flows of the first application that each carry the association identifier.

The indication information (which may be referred to as first indication information in this embodiment of this application) indicates the UPF to perform joint scheduling on the plurality of QoS flows of the first application that each carry the association identifier. The indication information may be referred to as a scheduling indication, an operation indication, or the like. For example, the joint scheduling herein may be continuously sending the QoS flows of the first application. Therefore, based on the indication information, the UPF may continuously send the QoS flows of the first application, or send the QoS flows of the first application within a time window of preset duration, or a sending time interval between any two continuously sent QoS flows of the first application does not exceed a first time threshold.

For specific implementation methods of the indication information, refer to the related descriptions in the embodiment in FIG. 3. Details are not described herein again.

In an example, in step 405, the SMF sends Nsmf_Communication_N1N2MessageTransfer to the UPF, where Nsmf_Communication_N1N2MessageTransfer carries the indication information and the QoS policies of the different QoS flows of the first application.

Step 406: The SMF sends indication information and the QoS policies of the different QoS flows of the first application to the RAN. Accordingly, the RAN may receive the indication information and the QoS policies of the different QoS flows of the first application.

The indication information (which may be referred to as the first indication information in this embodiment of this application) indicates the RAN to perform joint scheduling on the plurality of QoS flows of the first application that each carry the association identifier. For example, the joint scheduling herein may include one or more of the following:

(1) Objects on which the RAN is to perform joint scheduling are the plurality of QoS flows of the first application.

(2) The RAN maps, to at least one radio bearer, a QoS flow that is in at least two QoS flows and that carries a first QoS flow identifier and the association identifier of the first application, and optionally, maps, to a radio bearer different from the at least one radio bearer, a QoS flow that is in the at least two QoS flows and that does not carry the association identifier of the first application.

Alternatively, it is understood that the RAN maps QoS flows of the first application that have a same QFI to one or more radio bearers, and optionally, maps a QoS flow of a second application to a second radio bearer. The second radio bearer is different from a first radio bearer, and the second application and the first application are different applications. Alternatively, it is understood that the RAN maps QoS flows of a same application that have a same QFI to one or more radio bearers, and maps QoS flows of different applications to different radio bearers.

(3) The RAN sends the QoS flows of the first application based on sending proportions corresponding to QoS priorities of the QoS flows.

Alternatively, it is understood that the RAN sends the QoS flows of the first application based on sending proportions respectively corresponding to priorities of the different QoS flows of the first application.

For specific implementation methods of the indication information, refer to the related descriptions in the embodiment in FIG. 3. Details are not described herein again.

In an example, in step 406, the SMF sends Nsmf_Communication_N1N2MessageTransfer to the RAN, where Nsmf_Communication_N1N2MessageTransfer carries the indication information and the QoS policies of the different QoS flows of the first application.

Step 407: The AF sends downlink data packets of the first application to the UPF. Accordingly, the UPF may receive the downlink data packets of the first application.

The UPF may classify the downlink data packets of the first application into different QoS flows. Each QoS flow has a corresponding QoS policy. The QoS policy is obtained in step 405.

Step 408: The UPF performs, based on the indication information and the association identifier in the QoS policies, joint scheduling on the QoS flows of the first application that each carry the association identifier.

For specific joint scheduling methods, refer to the descriptions in step 405.

Step 409: The UPF sends the QoS flows of the first application to the RAN. Accordingly, the RAN may receive the QoS flows of the first application.

It should be noted that step 408 and step 409 may be combined into one step during actual execution. To be specific, in a process of sending the downlink data packets of the first application to the RAN, the UPF performs, based on the indication information and the association identifier of the first application, joint scheduling on the QoS flows belonging to the first application. For specific joint scheduling methods, refer to the descriptions in step 405.

Step 410: The RAN performs, based on the indication information and the association identifier in the QoS policies, joint scheduling on the QoS flows of the first application that each carry the association identifier.

For specific joint scheduling methods, refer to the descriptions in step 406.

Step 411: The RAN sends the QoS flows of the first application to the terminal device. Accordingly, the terminal device may receive the QoS flows of the first application.

Specifically, the RAN sends the QoS flows of the first application to the terminal device by using a radio bearer. The QoS flows of the first application include the downlink data packets of the first application.

It should be noted that step 410 and step 411 may be combined into one step during actual execution. To be specific, in a process of sending the QoS flows of the first application to the terminal device, the RAN performs, based on the indication information and the association identifier of the first application, joint scheduling on the QoS flows belonging to the first application. For specific joint scheduling methods, refer to the descriptions in step 406.

Based on the foregoing solution, the RAN and the UPF identify, based on the association identifier, QoS flows belonging to a same application, and perform joint scheduling, and it is ensured that the QoS flows of the same application can arrive at the terminal device simultaneously or a time interval between arrivals at the terminal device is small, so that the service experience of the user can be improved. However, in a conventional technology, the UPF and the RAN can only identify different QoS flows, but cannot learn whether there is an internal relationship between the different QoS flows, that is, cannot identify whether the different QoS flows belong to a same application. Consequently, joint scheduling cannot be implemented.

In the embodiment corresponding to FIG. 4A and FIG. 4B, the SMF sends the association identifier of the first application to the UPF and the RAN, or sends the association identifier of the first application and the indication information (which is also referred to as the first indication information). During actual implementation, other methods may alternatively be used. For example, in another implementation method, the SMF sends the association identifier of the first application to the RAN, and the AF sends the association identifier of the first application to the UPF via a NEF. Alternatively, in another implementation method, the SMF sends the association identifier of the first application and the indication information (which is also referred to as the first indication information) to the RAN, and the AF sends the association identifier of the first application and the indication information (which is also referred to as the first indication information) to the UPF via a NEF. That is, the association identifier that is of the first application and that is received by the RAN or the association identifier of the first application and the indication information that are received by the RAN are from the SMF, and the association identifier that is of the first application and that is received by the UPF or the association identifier of the first application and the indication information that are received by the UPF may be from the SMF, or may be from the AF.

The solutions provided in this application are described above mainly from a perspective of interaction between the network elements. It may be understood that, to implement the foregoing functions, each network element includes a corresponding hardware structure and/or software module for executing each function. A person skilled in the art should be quite easily aware that, in combination with the examples described in embodiments disclosed in this specification, units, algorithms, and steps can be implemented by hardware or a combination of hardware and computer software in the present invention. Whether a function is performed by hardware or hardware driven by computer software depends on particular applications and design constraints of the technical solutions. A person skilled in the art may use different methods to implement the functions for each particular application, but it should not be considered that the implementation goes beyond the scope of the present invention.

It may be understood that in the foregoing method embodiments, corresponding steps or operations implemented by the policy control network element may alternatively be implemented by a component (for example, a chip or a circuit) configured in the policy control network element, corresponding steps or operations implemented by the session management network element may alternatively be implemented by a component (for example, a chip or a circuit) configured in the session management network element, and corresponding steps or operations implemented by the access network device may alternatively be implemented by a component (for example, a chip or a circuit) configured in the access network device.

Figure 5:
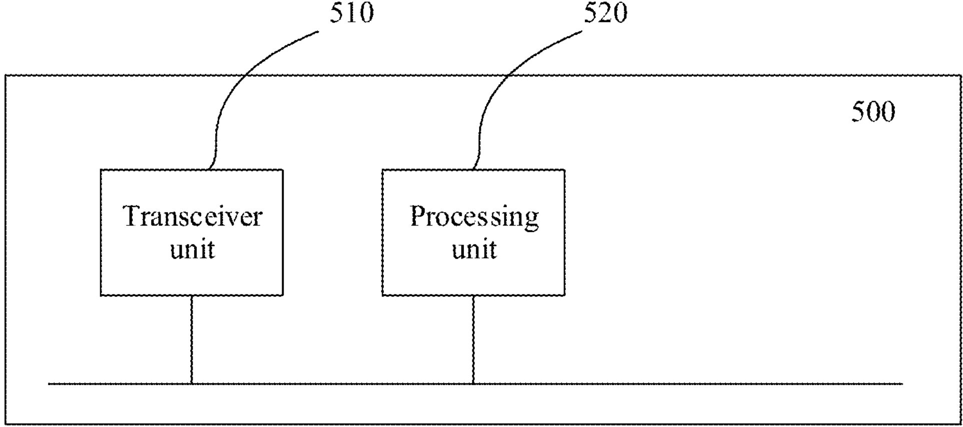
FIG. 5 is a schematic diagram of a communication apparatus according to an embodiment of this application.

FIG. 5 is a schematic diagram of a communication apparatus according to an embodiment of this application. The apparatus is configured to implement corresponding steps performed by the first network element (which may be an access network device or a user plane network element) in the embodiment in FIG. 3 or FIG. 4A and FIG. 4B. As shown in FIG. 5, the apparatus 500 includes a transceiver unit 510 and a processing unit 520.

The transceiver unit 510 is configured to receive an association identifier of a first application from a session management network element, where the association identifier is for associating different quality of service QoS flows of the first application. The processing unit 520 is configured to perform joint scheduling on the plurality of QoS flows of the first application that each carry the association identifier.

In a possible implementation method, the transceiver unit 510 is further configured to receive indication information from the session management network element. When performing joint scheduling on the plurality of QoS flows of the first application that each carry the association identifier, the processing unit 520 is specifically configured to perform joint scheduling on the plurality of QoS flows based on the indication information.

In a possible implementation method, the communication apparatus is a user plane network element. When performing joint scheduling on the plurality of QoS flows of the first application that each carry the association identifier, the processing unit 520 is specifically configured to: receive data packets of the first application; classify the data packets of the first application into the plurality of QoS flows; and continuously send the plurality of QoS flows to an access network device; send the plurality of QoS flows to an access network device within a time window of preset duration; or send the plurality of QoS flows to an access network device, where a sending time interval between any two continuously sent QoS flows in the plurality of QoS flows does not exceed a first time threshold.

In a possible implementation method, the communication apparatus is an access network device. When performing joint scheduling on the plurality of QoS flows of the first application that each carry the association identifier, the processing unit 520 is specifically configured to: accept the plurality of QoS flows from a user plane network element; or reject the plurality of QoS flows from a user plane network element.

In a possible implementation method, the communication apparatus is an access network device. When performing joint scheduling on the plurality of QoS flows of the first application that each carry the association identifier, the processing unit 520 is specifically configured to: receive at least two QoS flows from a user plane network element by using the transceiver unit 510, where the at least two QoS flows include the plurality of QoS flows of the first application; and map, to a first radio bearer, a QoS flow that is in the at least two QoS flows and that carries a first QoS flow identifier and the association identifier.

In a possible implementation method, the communication apparatus is the access network device. The processing unit 520 is further configured to map, to a second radio bearer, a QoS flow that is in the at least two QoS flows and that carries a second QoS flow identifier and the association identifier.

In a possible implementation method, the communication apparatus is the access network device. The processing unit 520 is further configured to map, to a third radio bearer, a QoS flow that is in the at least two QoS flows and that does not carry the association identifier.

In a possible implementation method, the communication apparatus is an access network device. When performing joint scheduling on the plurality of QoS flows of the first application that each carry the association identifier, the processing unit 520 is specifically configured to: receive the plurality of QoS flows from a user plane network element by using the transceiver unit 510; and send the plurality of QoS flows to a terminal device by using the transceiver unit 520 based on sending proportions respectively corresponding to priorities of the different QoS flows in the plurality of QoS flows.

In a possible implementation method, when receiving the association identifier of the first application from the session management network element, the transceiver unit 510 is specifically configured to receive QoS policies of the plurality of QoS flows from the session management network element, where the QoS policies each carry the association identifier.

Optionally, the communication apparatus 500 may further include a storage unit. The storage unit is configured to store data or instructions (which may also be referred to as code or a program). The foregoing units may interact with or be coupled to the storage unit, to implement a corresponding method or function. For example, a processing unit 520 may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, the units may be all or partially integrated, or may be implemented independently. The processing element herein may also be referred to as a processor, and may be an integrated circuit having a signal processing capability. During implementation, the steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application specific integrated circuits (ASIC), one or more microprocessors (DSP), one or more field programmable gate arrays (FPGA), or a combination of at least two of the integrated circuit forms. For another example, when the units in the apparatus may be implemented in a form of a program invoked by a processing element, the processing element may be a general-purpose processor, for example, a central processing unit (CPU) or another processor that can invoke the program. For another example, the units may be integrated and implemented in a form of a system-on-a-chip (SOC).

The foregoing transceiver unit 510 is an interface circuit of the apparatus, and is configured to receive a signal from another apparatus. For example, when the apparatus is implemented in a manner of a chip, the transceiver unit 510 is an interface circuit that is of the chip and that is configured to send/receive a signal to/from another chip or apparatus.

Figure 6:
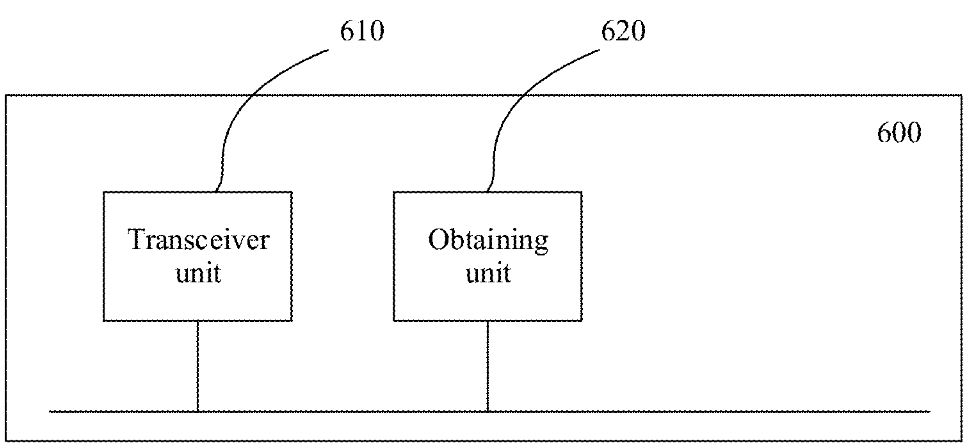
FIG. 6 is a schematic diagram of another communication apparatus according to an embodiment of this application.

FIG. 6 is a schematic diagram of another communication apparatus according to an embodiment of this application. The apparatus is configured to implement corresponding steps performed by the session management network element in the embodiment in FIG. 3 or FIG. 4A and FIG. 4B. As shown in FIG. 6, the apparatus 600 includes a transceiver unit 610 and an obtaining unit 620.

The obtaining unit 620 is configured to obtain an association identifier of a first application, where the association identifier is for associating different quality of service QoS flows of the first application. The transceiver unit 610 is configured to send the association identifier to a first network element.

In a possible implementation method, the transceiver unit 610 is further configured to send first indication information to the first network element, where the first indication information indicates to perform joint scheduling on the plurality of QoS flows of the first application that each carry the association identifier.

In a possible implementation method, the first network element is a user plane network element. That the first indication information indicates to perform joint scheduling on the plurality of QoS flows of the first application that each carry the association identifier includes: The first indication information indicates to continuously send the plurality of QoS flows.

In a possible implementation method, the first network element is an access network device. That the first indication information indicates to perform joint scheduling on the plurality of QoS flows of the first application that each carry the association identifier includes: The first indication information indicates that objects on which joint scheduling is to be performed are the plurality of QoS flows; and/or the first indication information indicates to send the plurality of QoS flows based on sending proportions respectively corresponding to priorities of the different QoS flows in the plurality of QoS flows.

In a possible implementation method, the first network element is an access network device. That the first indication information indicates to perform joint scheduling on the plurality of QoS flows of the first application that each carry the association identifier includes: The first indication information indicates to map, to at least one radio bearer, QoS flows that are in at least two QoS flows and that each carry a same QoS flow identifier and the association identifier, where the at least two QoS flows include the plurality of QoS flows.

In a possible implementation method, the first indication information further indicates to map, to a radio bearer different from the at least one radio bearer, a QoS flow that is in the at least two QoS flows and that does not carry the association identifier.

In a possible implementation method, the association identifier indicates to perform joint scheduling on the plurality of QoS flows of the first application that each carry the association identifier.

In a possible implementation method, the first network element is a user plane network element. That the association identifier indicates to perform joint scheduling on the plurality of QoS flows of the first application that each carry the association identifier includes: The association identifier indicates to continuously send the plurality of QoS flows.

In a possible implementation method, the first network element is an access network device. That the association identifier indicates to perform joint scheduling on the plurality of QoS flows of the first application that each carry the association identifier includes: The association identifier indicates that objects on which joint scheduling is to be performed are the plurality of QoS flows; and/or the association identifier indicates to send the plurality of QoS flows based on sending proportions respectively corresponding to priorities of the different QoS flows in the plurality of QoS flows.

In a possible implementation method, the first network element is an access network device. That the association identifier indicates to perform joint scheduling on the plurality of QoS flows of the first application that each carry the association identifier includes: The association identifier indicates to map, to at least one radio bearer, QoS flows that are in at least two QoS flows and that each carry a same QoS flow identifier and the association identifier, where the at least two QoS flows include the plurality of QoS flows.

In a possible implementation method, the association identifier further indicates to map, to a radio bearer different from the at least one radio bearer, a QoS flow that is in the at least two QoS flows and that does not carry the association identifier.

In a possible implementation method, when obtaining the association identifier of the first application, the obtaining unit 620 is specifically configured to: obtain subscription data of a terminal device from a policy control network element, where the subscription data includes information about the first application, and the information about the first application includes an identifier of the first application and the association identifier; or obtain subscription data of a terminal device from a policy control network element, where the subscription data includes information about the first application, and the information about the first application includes an identifier of the first application and second indication information; and generate the association identifier based on the second indication information.

In a possible implementation method, when sending the association identifier to the first network element, the transceiver unit 610 is specifically configured to send QoS policies of the plurality of QoS flows to the first network element, where the QoS policies each carry the association identifier.

Optionally, the communication apparatus 600 may further include a storage unit. The storage unit is configured to store data or instructions (which may also be referred to as code or a program). The foregoing units may interact with or be coupled to the storage unit, to implement a corresponding method or function.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, the units may be all or partially integrated, or may be implemented independently. The processing element herein may also be referred to as a processor, and may be an integrated circuit having a signal processing capability. During implementation, the steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application specific integrated circuits (ASIC), one or more microprocessors (DSP), one or more field programmable gate arrays (FPGA), or a combination of at least two of the integrated circuit forms. For another example, when the units in the apparatus may be implemented in a form of a program invoked by a processing element, the processing element may be a general-purpose processor, for example, a central processing unit (CPU) or another processor that can invoke the program. For another example, the units may be integrated and implemented in a form of a system-on-a-chip (SOC).

The foregoing transceiver unit 610 is an interface circuit of the apparatus, and is configured to receive a signal from another apparatus. For example, when the apparatus is implemented in a manner of a chip, the transceiver unit 610 is an interface circuit that is of the chip and that is configured to send/receive a signal to/from another chip or apparatus.

Figure 7:
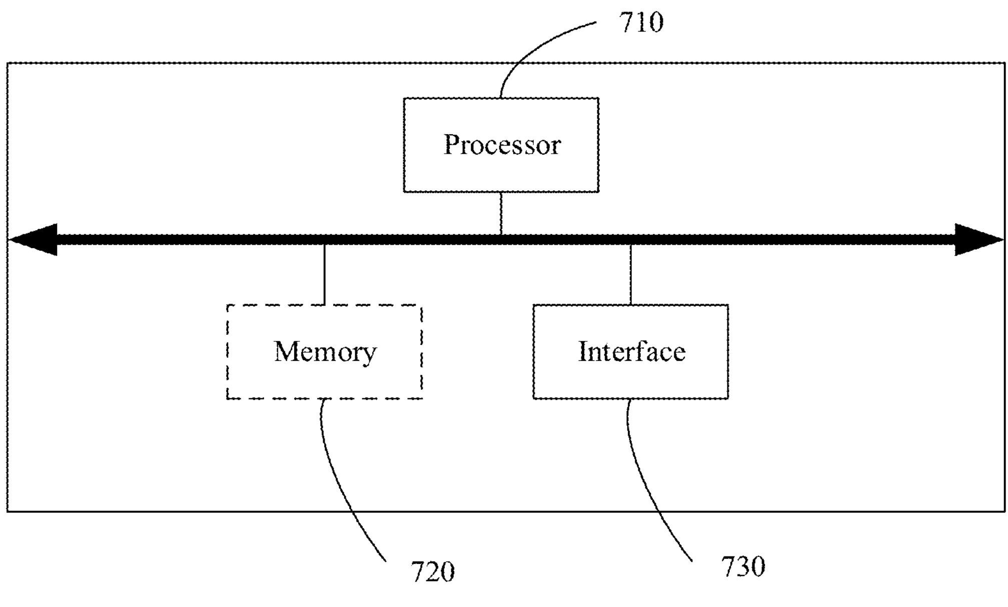
FIG. 7 is a schematic diagram of another communication apparatus according to an embodiment of this application.

FIG. 7 is a schematic diagram of another communication apparatus according to an embodiment of this application. The communication apparatus is configured to implement the operations of the first network element (which may be an access network device or a user plane network element) or the session management network element in the foregoing embodiments. As shown in FIG. 7, the communication apparatus includes a processor 710 and an interface 730. Optionally, the communication apparatus further includes a memory 720. The interface 730 is configured to communicate with another device.

The methods performed by the first network element or the session management network element in the foregoing embodiments may be implemented by the processor 710 by invoking a program stored in a memory (which may be the memory 720 in the first network element or the session management network element, or may be an external memory). That is, an apparatus used in the first network element or the session management network element may include the processor 710. The processor 710 invokes the program in the memory, to perform the methods performed by the first network element or the session management network element in the foregoing method embodiments. The processor herein may be an integrated circuit having a signal processing capability, for example, a CPU. The apparatus used in the first network element or the session management network element may be implemented by using one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be referenced.

Specifically, functions/implementation processes of the transceiver unit 510 and the processing unit 520 in FIG. 5 may be implemented by the processor 710 in the communication apparatus 700 shown in FIG. 7 by invoking computer-executable instructions stored in the memory 720. Alternatively, a function/an implementation process of the processing unit 520 in FIG. 5 may be implemented by the processor 710 in the communication apparatus 700 shown in FIG. 7 by invoking computer-executable instructions stored in the memory 720, and a function/an implementation process of the transceiver unit 510 in FIG. 5 may be implemented by using the interface 730 in the communication apparatus 700 shown in FIG. 7.

Specifically, functions/implementation processes of the transceiver unit 610 and the obtaining unit 620 in FIG. 6 may be implemented by the processor 710 in the communication apparatus 700 shown in FIG. 7 by invoking computer-executable instructions stored in the memory 720. Alternatively, a function/an implementation process of the obtaining unit 620 in FIG. 6 may be implemented by the processor 710 in the communication apparatus 700 shown in FIG. 7 by invoking computer-executable instructions stored in the memory 720, and a function/an implementation process of the transceiver unit 610 in FIG. 6 may be implemented by using the interface 730 in the communication apparatus 700 shown in FIG. 7.

A person of ordinary skill in the art may understand that "first", "second", "third", and various numbers in this application are merely used for differentiation for ease of description, and are not for limiting the scope of embodiments of this application or representing a sequence. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one" means one or more. At least two means two or more. "At least one", "any one", or a similar expression thereof indicates any combination of the items, and includes a singular item or any combination of plural items. For example, at least one of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in various embodiments of this application. The execution sequences of the processes should be determined based on functions and internal logic of the processes, and should not constitute any limitation on implementation processes of embodiments of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The various illustrative logical units and circuits in embodiments of this application may implement or operate the functions by using a general-purpose processor, a digital signal processor, an application specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Steps of the methods or algorithms in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be disposed in an ASIC.

These computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specified function in one or more processes in the flowcharts and/or in one or more blocks in the block diagrams.

In one or more example designs, the foregoing functions in this application may be implemented by using hardware, software, firmware, or any combination thereof. If the functions are implemented by using the software, the functions may be stored in a computer-readable medium, or are transmitted to the computer-readable medium in a form of one or more instructions or code. Computer-readable media include a computer storage medium and a communication medium that enables a computer program to move from one place to another. The storage medium may be an available medium that can be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be for bearing or storing program code, where the program code is in a form of instructions or a data structure and in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, and microwave, the software is included in a defined computer-readable medium. The disk and the disc include a compact disc, a laser disc, an optical disc, a digital versatile disc (DVD), a floppy disk, and a Blu-ray disc. The disc usually copies data in a magnetic manner, and the disk usually optically copies data in a laser manner. The foregoing combination may also be included in the computer-readable medium.

A person skilled in the art should be aware that in the foregoing one or more examples, functions described in this application may be implemented by using hardware, software, firmware, or any combination thereof. When the functions are implemented by using the software, the functions may be stored in a computer-readable medium or transmitted as one or more instructions or code in the computer-readable medium. Computer-readable media include a computer storage medium and a communication medium. The communication medium includes any medium that enables a computer program to be transmitted from one place to another. The storage medium may be any available medium accessible to a general-purpose or special-purpose computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application. According to the foregoing descriptions of this specification in this application, technologies in the art may use or implement the content of this application. Any modification based on the disclosed content shall be considered obvious in the art. The basic principles in this application may be applied to other variations without departing from the inventive essence and scope of this application. Therefore, the content disclosed in this application is not limited to embodiments and the designs but may also be extended to a maximum scope that is consistent with the principles and disclosed new features of this application.

Although this application is described with reference to specific features and embodiments thereof, obviously, various modifications and combinations may be made to them without departing from the spirit and scope of this application. Correspondingly, the specification and accompanying drawings are merely example descriptions of this application defined by the appended claims, and are considered as covering any of or all modifications, variations, combinations, or equivalents within the scope of this application. Obviously, a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, comprising:

receiving, by a user plane network element, an association identifier of an application from a session management network element, wherein the association identifier indicates a plurality of different quality of service (QoS) flows of the application to be associated; and performing, by the user plane network element, joint scheduling on the plurality of QoS flows of the application that each carry the association identifier;

wherein the performing the joint scheduling comprises:

sending, by the user plane network element, the plurality of QoS flows to an access network device, wherein a sending time interval between any two continuously sent QoS flows in the plurality of QoS flows does not exceed a first time threshold.

2. The communication method according to claim 1, wherein the communication method further comprises:

receiving, by the access network device, the association identifier from the session management network element;

receiving, by the access network device, at least two QoS flows from the user plane network element, wherein the at least two QoS flows comprise the plurality of QoS flows of the first application; and mapping, by the access network device to a first radio bearer, a QoS flow that is in the at least two QoS flows and that carries a first QoS flow identifier and the association identifier.

3. The communication method according to claim 2, wherein the communication method further comprises:

mapping, by the access network device to a second radio bearer, another QoS flow that is in the at least two QoS flows and that carries a second QoS flow identifier and the association identifier.

4. The communication method according to claim 2, wherein the communication method further comprises:

mapping, by the access network device to a third radio bearer, another QoS flow that is in the at least two QoS flows and that does not carry the association identifier.

5. The communication method according to claim 1, wherein the communication method further comprises:

receiving, by the access network device, the plurality of QoS flows from the user plane network element; and sending, by the access network device, the plurality of QoS flows to a terminal based on sending proportions respectively corresponding to priorities of the different QoS flows in the plurality of QoS flows.

6. The communication method according to claim 1, wherein the receiving, by the user plane network element, the association identifier comprises:

receiving, by the user plane network element, QoS policies of the plurality of QoS flows from the session management network element, wherein the QoS policies each carry the association identifier.

7. The communication method according to claim 1, further comprising:

obtaining, by the session management network element, the association identifier of the application; and sending, by the session management network element, the association identifier to the user plane network element.

8. The communication method according to claim 1, further comprising:

receiving, by the user plane network element, indication information from the session management network element; and the performing the joint scheduling further comprises:

performing, by the user plane network element, the joint scheduling on the plurality of QoS flows based on the indication information.

9. The communication method according to claim 1, wherein the performing the joint scheduling comprises:

receiving, by the user plane network element, data packets of the application;

classifying, by the user plane network element, the data packets of the application into the plurality of QoS flows.

10. The communication method according to claim 1, further comprising:

receiving, by the access network device, the association identifier from session management network element;

accepting, by the access network device and based on the association identifier, the plurality of QoS flows from a user plane network element; or rejecting, by the access network device and based on the association identifier, the plurality of QoS flows from the user plane network element.

11. An apparatus, comprising:

a processor configured to execute instructions stored in a memory to cause the apparatus to:

receive an association identifier of an application from a session management network element, wherein the association identifier indicates a plurality of different quality of service (QoS) flows of the application to be associated; and perform joint scheduling on the plurality of QoS flows of the application that each carry the association identifier;

wherein the performing the joint scheduling comprises:

sending the plurality of QoS flows to an access network device, wherein a sending time interval between any two continuously sent QoS flows in the plurality of QoS flows does not exceed a first time threshold.

12. The apparatus according to claim 11, wherein receiving the association identifier from the session management network element comprises:

receiving QoS policies of the plurality of QoS flows from the session management network element, wherein the QoS policies each carry the association identifier.

13. The apparatus according to claim 11, wherein the apparatus is further caused to:

receive indication information from the session management network element; and the performing the joint scheduling further comprises:

performing joint scheduling on the plurality of QoS flows based on the indication information.

14. The apparatus according to claim 11, wherein the performing the joint scheduling comprises:

receiving data packets of the application;

classifying the data packets of the application into the plurality of QoS flows.

15. A communication system, comprising:

a session management network element implemented by at least one processor executing code stored in at least one memory, and a user plane network element implemented by the at least one processor executing code stored in the at least one memory, wherein the session management network element is configured to: send, to the user plane network element, an association identifier of an application that indicates a plurality of different quality of service (QoS) flows of the application to be associated;

the user plane network element is configured to: receive the association identifier of the application, and perform joint scheduling on the plurality of QoS flows of the application that each carry the association identifier; and wherein the performing the joint scheduling comprises:

sending, by the user plane network element, the plurality of QoS flows to an access network device, wherein a sending time interval between any two continuously sent QoS flows in the plurality of QoS flows does not exceed a first time threshold.

16. The communication system according to claim 15, wherein sending, to the user plane network element, the association identifier comprises:

sending QoS policies of the plurality of QoS flows to the user plane network element, wherein the QoS policies each carry the association identifier.

17. The communication system according to claim 15, wherein the user plane network element is further configured to receive indication information from the session management network element; and the user plane network element is further configured to perform the joint scheduling by:

performing joint scheduling on the plurality of QoS flows based on the indication information.

18. The communication system according to claim 15, further comprising the access network device, wherein the access network device is configured to:

receive the plurality of QoS flows from the user plane network element; and send the plurality of QoS flows to a terminal based on sending proportions respectively corresponding to priorities of the different QoS flows in the plurality of QoS flows.

19. The communication system according to claim 15, wherein the access network device is configured to receive QoS policies of the plurality of QoS flows from the session management network element, wherein the QoS policies each carry the association identifier.

20. The communication system according to claim 15, wherein the performing the joint scheduling comprises:

receiving, by the user plane network element, data packets of the application;

classifying, by the user plane network element, the data packets of the application into the plurality of QoS flows.

* * * * *